US012812664B2

(12) United States Patent
Xu et al.

(10) Patent No.: US 12,812,664 B2
(45) Date of Patent: Nov. 24, 2026

(54) MULTICAST RECEPTION IN INACTIVE STATE

(71) Applicant: Apple Inc., Cupertino, CA (US)

(72) Inventors: Fangli Xu, Beijing (CN); Haijing Hu, Los Gatos, CA (US); Peng Cheng, Beijing (CN); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 18/406,017

(22) Filed: Jan. 5, 2024

(65) Prior Publication Data

US 2024/0267936 A1 Aug. 8, 2024

Related U.S. Application Data

(60) Provisional application No. 63/483,714, filed on Feb. 7, 2023.

(51) Int. Cl.
*H04W 72/04* (2023.01)
*H04W 72/1273* (2023.01)
(Continued)

(52) U.S. Cl.
CPC ....... *H04W 72/30* (2023.01); *H04W 72/1273* (2013.01); *H04W 72/232* (2023.01); *H04W 76/28* (2018.02)

(58) Field of Classification Search
CPC ............. H04W 72/30; H04W 72/1273; H04W 72/232; H04W 76/28; H04W 76/40;
(Continued)

(56) References Cited

U.S. PATENT DOCUMENTS

2014/0161020 A1* 6/2014 Jung ..................... H04W 48/20 370/312
2018/0167881 A1* 6/2018 Lee .................. H04W 52/0216
(Continued)

FOREIGN PATENT DOCUMENTS

EP 4654726 A1 * 11/2025 ............ H04W 76/27
WO 2022211499 A1 10/2022

OTHER PUBLICATIONS

International Preliminary Report on Patentability issued in PCT Application No. PCT/US2024/011746, dated Aug. 21, 2025 in 17 pages.

(Continued)

*Primary Examiner* — Mahbubul Bar Chowdhury
(74) *Attorney, Agent, or Firm* — Kilpatrick Townsend & Stockton LLP

(57) ABSTRACT

The present application relates to devices and components including apparatus, systems, and methods to configure user equipments (UEs) in wireless communication systems for multicast reception in the inactive state. In embodiments, base stations provide multicast point-to-multipoint (PTM) configurations to inactive UEs by a multicast/broadcast services control channel (MCCH) to configure the UEs for multicast PTM operation. Approaches for configuring the UEs include providing partial multicast configuration via the MCCH, or providing an index of a multicast PTM configuration via the MCCH. Further, approaches include UE dedicated configuration of the MCCH, or a security scheme applied for multicast and broadcast services multicast configuration transmitted via the MCCH.

14 Claims, 16 Drawing Sheets

(51) Int. Cl.
*H04W 72/232* (2023.01)
*H04W 72/30* (2023.01)
*H04W 76/28* (2018.01)

(58) Field of Classification Search
CPC ............. H04W 76/27; H04W 52/0216; H04W 52/0219; H04W 52/0229; H04W 52/0235; H04W 52/028
See application file for complete search history.

(56) References Cited

U.S. PATENT DOCUMENTS

| | | | | |
|---|---|---|---|---|
| 2023/0362960 | A1* | 11/2023 | Adjakple | H04W 4/08 |
| 2025/0048062 | A1* | 2/2025 | Li | H04W 76/40 |
| 2025/0142666 | A1* | 5/2025 | Li | H04W 76/40 |
| 2025/0261282 | A1* | 8/2025 | Fujishiro | H04W 36/08 |
| 2025/0358892 | A1* | 11/2025 | Fujishiro | H04W 76/27 |

OTHER PUBLICATIONS

"Multicast reception in RRC_INACTIVE", Intel Corporation, 3GPP TSG-RAN WG2 Meeting #120, R2-2212185, Nov. 14-18, 2022, 6 pages.
"Multicast Reception in RRC_INACTIVE State", Apple, 3GPP TSG-RAN WG2 Meeting #120, R2-2211730, Nov. 14-18, 2022, 6 pages.
The International Application No. PCT/US2024/011746, "International Search Report and Written Opinion," mailed May 13, 2024, 21 pages.

* cited by examiner

402

```
MRB-ToAddMod-r17 ::=                SEQUENCE {
 mbs-SessionId-r17           TMGI-r17                  OPTIONAL, -- Cond MBSSetup
 mrb-Identity-r17            MRB-Identity-r17,
 mrb-IdentityNew-r17                  MRB-Identity-r17   OPTIONAL, -- Need N
 reestablishPDCP-r17                  ENUMERATED{true}            OPTIONAL, -- Need N
 recoverPDCP-r17             ENUMERATED{true}          OPTIONAL, -- Need N
 pdcp-Config-r17                      PDCP-Config                 OPTIONAL, -- Cond PDCP
 ...
}
```

404

```
MAC-CellGroupConfig ::=                 SEQUENCE {
 ...
 g-RNTI-ConfigToAddModList-r17          SEQUENCE (SIZE (1..maxG-RNTI-r17)) OF MBS-RNTI-SpecificConfig-r17          OPTIONAL, -- Need N
 g-RNTI-ConfigToReleaseList-r17         SEQUENCE (SIZE (1..maxG-RNTI-r17)) OF MBS-RNTI-SpecificConfigID-r17        OPTIONAL, -- Need N
 g-CS-RNTI-ConfigToAddModList-r17       SEQUENCE (SIZE (1..maxG-CS-RNTI-r17)) OF MBS-RNTI-SpecificConfig-r17       OPTIONAL, -- Need N
 g-CS-RNTI-ConfigToReleaseList-r17      SEQUENCE (SIZE (1..maxG-CS-RNTI-r17)) OF MBS-RNTI-SpecificConfigID-r17     OPTIONAL, -- Need N
 allowCSI-SRS-Tx-MulticastDRX-Active-r17  BOOLEAN                                                                  OPTIONAL  -- Need M
 ]],
 [[
 schedulingRequestID-PosMG-Request-r17  SchedulingRequestId                                                        OPTIONAL, -- Need R
 drx-LastTransmissionUL-r17             ENUMERATED (enabled)                                                       OPTIONAL  -- Need R
 ]]
}
```

FIG. 4

502

```
MBS-RNTI-SpecificConfig-r17 ::=            SEQUENCE {
 mbs-RNTI-SpecificConfigId-r17              MBS-RNTI-SpecificConfigId-r17,
 groupCommon-RNTI-r17                       CHOICE {
  g-RNTI                                     RNTI-Value,
  g-CS-RNTI                                  RNTI-Value
 },
 drx-ConfigPTM-r17                          SetupRelease { DRX-ConfigPTM-r17 }
 harq-FeedbackEnablerMulticast-r17          ENUMERATED { dci-enabler, enabled }
 harq-FeedbackOptionMulticast-r17           ENUMERATED { ack-nack, nack-only }
 pdsch-AggregationFactor-r17                ENUMERATED { n2, n4, n8 }
}
```

504

```
BWP-DownlinkDedicated ::=                  SEQUENCE {
 pdcch-Config                              SetupRelease { PDCCH-Config }                       OPTIONAL, -- Need M
 pdsch-Config                              SetupRelease { PDSCH-Config }                       OPTIONAL, -- Need M
 sps-Config                                SetupRelease { SPS-Config }                         OPTIONAL, -- Need M
 radioLinkMonitoringConfig                 SetupRelease { RadioLinkMonitoringConfig }          OPTIONAL, -- Need M
 ...,
 [[
 sps-ConfigToAddModList-r16                SPS-ConfigToAddModList-r16                          OPTIONAL, -- Need N
 sps-ConfigToReleaseList-r16               SPS-ConfigToReleaseList-r16                         OPTIONAL, -- Need N
 sps-ConfigDeactivationStateList-r16       SPS-ConfigDeactivationStateList-r16                 OPTIONAL, -- Need R
 beamFailureRecoverySCellConfig-r16        SetupRelease {BeamFailureRecoveryRSConfig-r16)      OPTIONAL, -- CondSCellOnly
 sl-PDCCH-Config-r16                       SetupRelease { PDCCH-Config }                       OPTIONAL, -- Need M
 sl-v2x-PDCCH-Config-r16                   SetupRelease { PDCCH-Config }                       OPTIONAL, -- Need M
 ]],
 [[
 preConfGapStatus-r17                      BIT STRING (SIZE (maxNrofGapId-r17))                OPTIONAL, -- Cond PreConfigMG
 beamFailureRecoverySPCellConfig-r17       SetupRelease { BeamFailureRecoveryRSConfig-r16}     OPTIONAL, -- Cond SpCellOnly
 harq-FeedbackEnablingforSPSactive-r17     BOOLEAN                                             OPTIONAL, -- Need R
 cfr-ConfigMulticast-r17                   SetupRelease { CFR-ConfigMulticast-r17 }            OPTIONAL, -- Need M
 dl-PPW-PreConfigToAddModList-r17          DL-PPW-PreConfigToAddModList-r17                    OPTIONAL, -- Need N
 dl-PPW-PreConfigToReleaseList-r17         DL-PPW-PreConfigToReleaseList-r17                   OPTIONAL, -- Need N
 nonCellDefiningSSB-r17                    NonCellDefiningSSB-r17                              OPTIONAL, -- Need R
 servingCellM0-r17                         MeasObjectId                                        OPTIONAL, -- Cond MeasObject-NCDSSB
 ]]
}
```

FIG. 5

602

```
DRX-ConfigPTM-r17 ::=                      SEQUENCE {
 drx-onDurationTimerPTM-r17                 CHOICE {
  subMilliSeconds                            INTEGER (1..31),
  milliSeconds                               ENUMERATED {
   ms1, ms2, ms3, ms4, ms5, ms6, ms8, ms10, ms20, ms30, ms40, ms50, ms60,
   ms80, ms100, ms200, ms300, ms400, ms500, ms600, ms800, ms1000, ms1200,
   ms1600, spare8, spare7, spare6, spare5, spare4, spare3, spare2, spare1
  }
 },
 drx-InactivityTimerPTM-r17                 ENUMERATED {
  ms0, ms1, ms2, ms3, ms4, ms5, ms6, ms8, ms10, ms20, ms30, ms40, ms50, ms60, ms80,
  ms100, ms200, ms300, ms500, ms750, ms1280, ms1820, ms2560, spare9, spare8,
  spare7, spare6, spare5, spare4, spare3, spare2, spare1
 },
 drx-HARQ-RTT-TimerDL-PTM-r17               INTEGER (0..56)          OPTIONAL, -- Cond HARQFeedback
 drx-RetransmissionTimerDL-PTM-r17          ENUMERATED {
  s10, s11, s12, s14, s16, s18, s116, s124, s133, s140, s164, s180, s196, s1112, s1128,
  s1160, s1320, spare15, spare14, spare13, spare12, spare11, spare10, spare9,
  spare8, spare7, spare6, spare5, spare4, spare3, spare2, spare1
 }                                                                   OPTIONAL, -- Cond HARQFeedback
 drx-LongCycleStartOffsetPTM-r17            CHOICE {
  ms10                                       INTEGER (0..9),
  ms20                                       INTEGER (0..19),
  ms32                                       INTEGER (0..31),
  ms40                                       INTEGER (0..39),
  ms60                                       INTEGER (0..59),
  ms64                                       INTEGER (0..63),
  ms70                                       INTEGER (0..69),
  ms80                                       INTEGER (0..79),
  ms128                                      INTEGER (0..127),
  ms160                                      INTEGER (0..159),
  ms256                                      INTEGER (0..255),
  ms320                                      INTEGER (0..319),
  ms512                                      INTEGER (0..511),
  ms640                                      INTEGER (0..639),
  ms1024                                     INTEGER (0..1023),
  ms1280                                     INTEGER (0..1279),
  ms2048                                     INTEGER (0..2047),
  ms2560                                     INTEGER (0..2559),
  ms5120                                     INTEGER (0..5119),
  ms10240                                    INTEGER (0..10239)
 },
 drx-SlotOffsetPTM-r17                       INTEGER (0..31)
}
```

FIG. 6

MULTICAST RECEPTION IN INACTIVE STATE

CROSS-REFERENCE TO RELATED APPLICATIONS

This application claims priority to U.S. provisional application No. 63/483,714, entitled "Multicast Reception in Inactive State," filed on Feb. 7, 2023, the disclosure of which is incorporated by reference herein in its entirety for all purposes.

TECHNICAL FIELD

The present application relates to the field of wireless technologies and, in particular, to multicast reception in inactive state.

BACKGROUND

Third Generation Partnership Project (3GPP) networks provide for a base station to multicast signals to one or more designated user equipments (UEs). The base station configures the designated UEs to receive the multicast signals, while other UEs not designated to receive the multicast signals are not configured for receiving the multicast signals.

BRIEF DESCRIPTION OF THE DRAWINGS

FIG. 4 illustrates a first portion of example information elements utilized for MBS multicast configuration in accordance with some embodiments.

FIG. 5 illustrates a second portion of example information elements utilized for MBS multicast configuration in accordance with some embodiments.

FIG. 6 illustrates a third portion of example information elements utilized for MBS multicast configuration in accordance with some embodiments.

DETAILED DESCRIPTION

Figure 1:
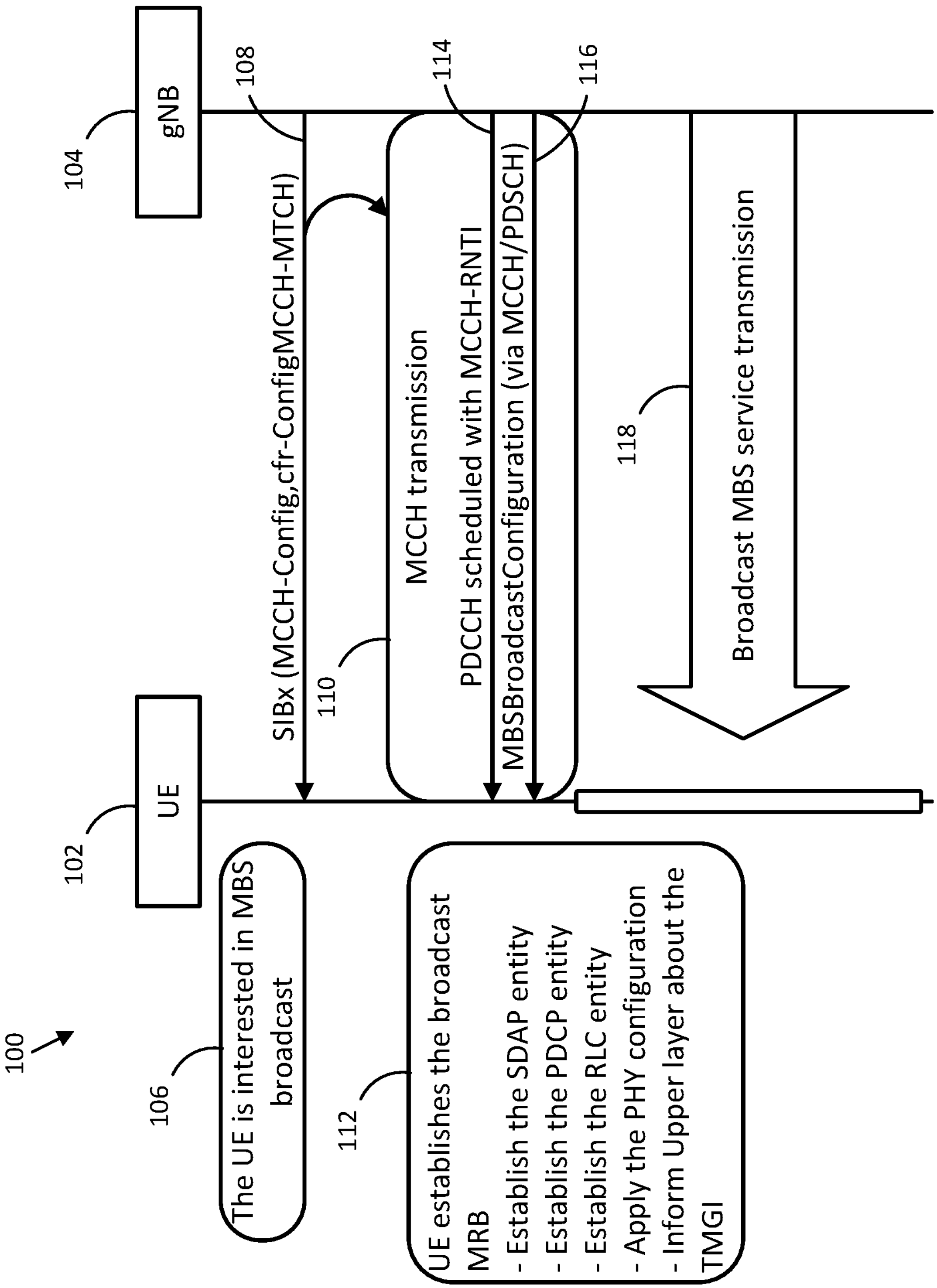
FIG. 1 illustrates an example multicast and broadcast service (MBS) broadcast configuration instance in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term “user equipment” or “UE” as used herein refers to a device with radio communication capabilities and may describe a remote user of network resources in a communications network. The term “user equipment” or “UE” may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term “user equipment” or “UE” may include any type of wireless/wired device or any computing device including a wireless communications interface.

The term “computer system” as used herein refers to any type interconnected electronic devices, computer devices, or components thereof. Additionally, the term “computer system” or “system” may refer to various components of a computer that are communicatively coupled with one another. Furthermore, the term “computer system” or “system” may refer to multiple computer devices or multiple computing systems that are communicatively coupled with one another and configured to share computing or networking resources.

The term “resource” as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A “hardware resource” may refer to compute, storage, or network resources provided by physical hardware element(s). A “virtualized resource” may refer to compute, storage, or network resources provided by virtualization infrastructure to an application, device, system, etc. The term “network resource” or “communication resource” may refer to resources that are accessible by computer devices/systems via a communications network. The term “system resources” may refer to any kind of shared entities to provide services, and may include computing or network resources. System resources may be considered as a set of coherent functions, network data objects or services, accessible through a server where such system resources reside on a single host or multiple hosts and are clearly identifiable.

The term “channel” as used herein refers to any transmission medium, either tangible or intangible, which is used to communicate data or a data stream. The term “channel” may be synonymous with or equivalent to “communications channel,” “data communications channel,” “transmission channel,” “data transmission channel,” “access channel,” “data access channel,” “link,” “data link,” “carrier,” “radiofrequency carrier,” or any other like term denoting a pathway or medium through which data is communicated. Additionally, the term “link” as used herein refers to a connection between two devices for the purpose of transmitting and receiving information.

The terms “instantiate,” “instantiation,” and the like as used herein refers to the creation of an instance. An “instance” also refers to a concrete occurrence of an object, which may occur, for example, during execution of program code.

The term “connected” may mean that two or more elements, at a common communication protocol layer, have an established signaling relationship with one another over a communication channel, link, interface, or reference point.

The term “network element” as used herein refers to physical or virtualized equipment or infrastructure used to provide wired or wireless communication network services. The term “network element” may be considered synonymous to or referred to as a networked computer, networking hardware, network equipment, network node, virtualized network function, or the like.

The term “information element” refers to a structural element containing one or more fields. The term “field” refers to individual contents of an information element, or a data element that contains content. An information element may include one or more additional information elements.

To enable resource-efficient delivery of multicast/broadcast services, third generation partnership project (3GPP) has developed new radio (NR) broadcast/multicast in release 17 (Rel-17), aiming to enable general multicast and broadcast services (MBS) over fifth generation system (5GS). The use cases identified that could benefit from this feature include public safety and mission critical, vehicle-to-everything (V2X) applications, Internet protocol television (IPTV), live video, software delivery over wireless and Internet-of-things (IoT) applications, etc. Two delivery modes have been agreed for Rel-17 MBS with delivery mode 1 (only for multicast) capable of addressing higher quality of service (QOS) services and delivery mode 2 (only for broadcast) focusing on lower QoS services. Given that Rel-17 MBS already provide the basic function to support MBS services, the general main goal for Rel-18 should be to enable better deployment of MBS, such as improvement of resource efficiency and capacity based on Rel-17 MBS.

In Rel-17, radio access network (RAN) only specifies multicast for UEs in radio resource control (RRC)_CONNECTED state, which may not fully fulfil the requirements of, e.g., Mission Critical Services, especially for cells with a large number of UEs. Also, to always keep user equipments (UEs) in RRC_CONNECTED state is not power efficient. It is therefore important to support multicast for UEs in RRC_INACTIVE.

The Rel-17 new radio (NR) MBS broadcast approach allows that the UE receives broadcast service in a downlink only manner i.e., performing broadcast reception without a need to access the network beforehand. However, in the typical use case for broadcast, the UE may be required to simultaneously receive broadcast service and unicast service from the network(s) of same or another operator, and some UEs may share the hardware resources between broadcast and unicast. Therefore, the unicast connection might be impacted by the broadcast reception for this kind of UEs. The optimization for such case is not specifically addressed in Rel-17, and should focus on the case of unicast reception in RRC_CONNECTED and broadcast reception from the same or different operators, including emergency and public safety broadcast.

Network sharing is a common practice to reduce network capital expenditure (CAPEX). With RAN sharing deployment, if the same Multicast/Broadcast service is provided by two (or more) operators separately, this service would be recognized as separate temporary mobile group identities (TMGIs) resulting in duplicated point-to-multipoint (PTM) radio resources consumption in the same cell for transmission of the same content. PTM may refer to a single point to two or more points. This justifies resource efficiency improvement in the RAN sharing scenario.

Note that public safety services benefit from the Rel-17 NR MBS functions, as well as from release 18 (Rel-18) enhancements that follow the above justifications.

Further enhancement of the NR Multicast/Broadcast functions based on Rel-17 MBS are desired. Some objectives for Rel-18 include the objectives discussed below.

A first objective may be to specify support of multicast reception by UEs in RRC_INACTIVE state. For example, PTM configuration for UEs receiving multicast in RRC_INACTIVE state may be desired. Further, study of the impact of mobility and state transition for UEs receiving multicast in RRC INACTIVE may be desired. Seamless/lossless mobility is not required for the support of multicast reception by the UEs in RRC_INACTIVE state.

Another objective may be to specify Uu signalling enhancements to allow a UE to use shared processing for MBS broadcast and unicast reception, i.e., including UE capability and related assistance information reporting regarding simultaneous unicast reception in RRC_CONNECTED and MBS broadcast reception from the same or different operators.

Another objective may be to study and, if necessary, specify enhancements to improve the resource efficiency for MBS reception in RAN sharing scenarios.

Figure 17:
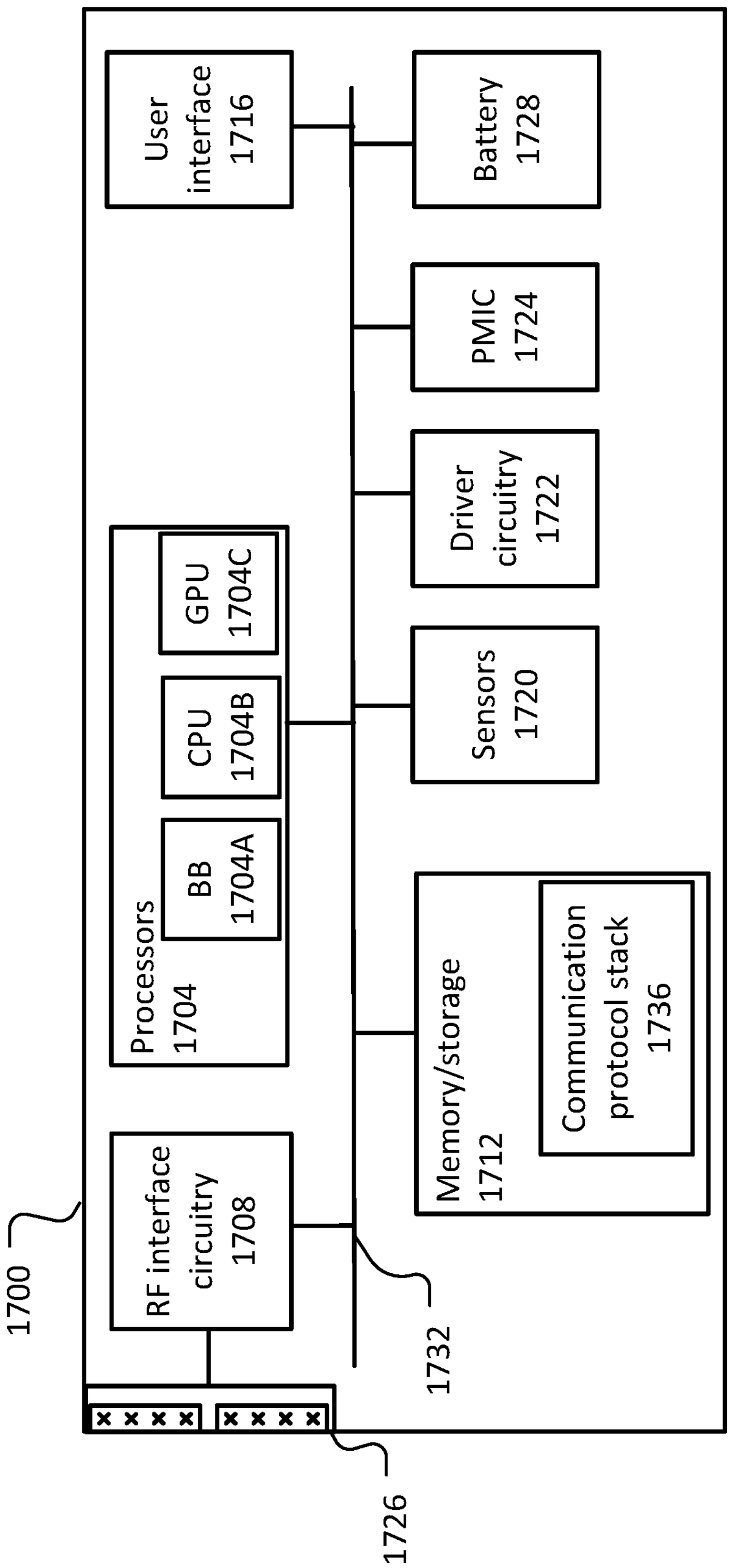
FIG. 17 illustrates an example UE in accordance with some embodiments.
Figure 18:
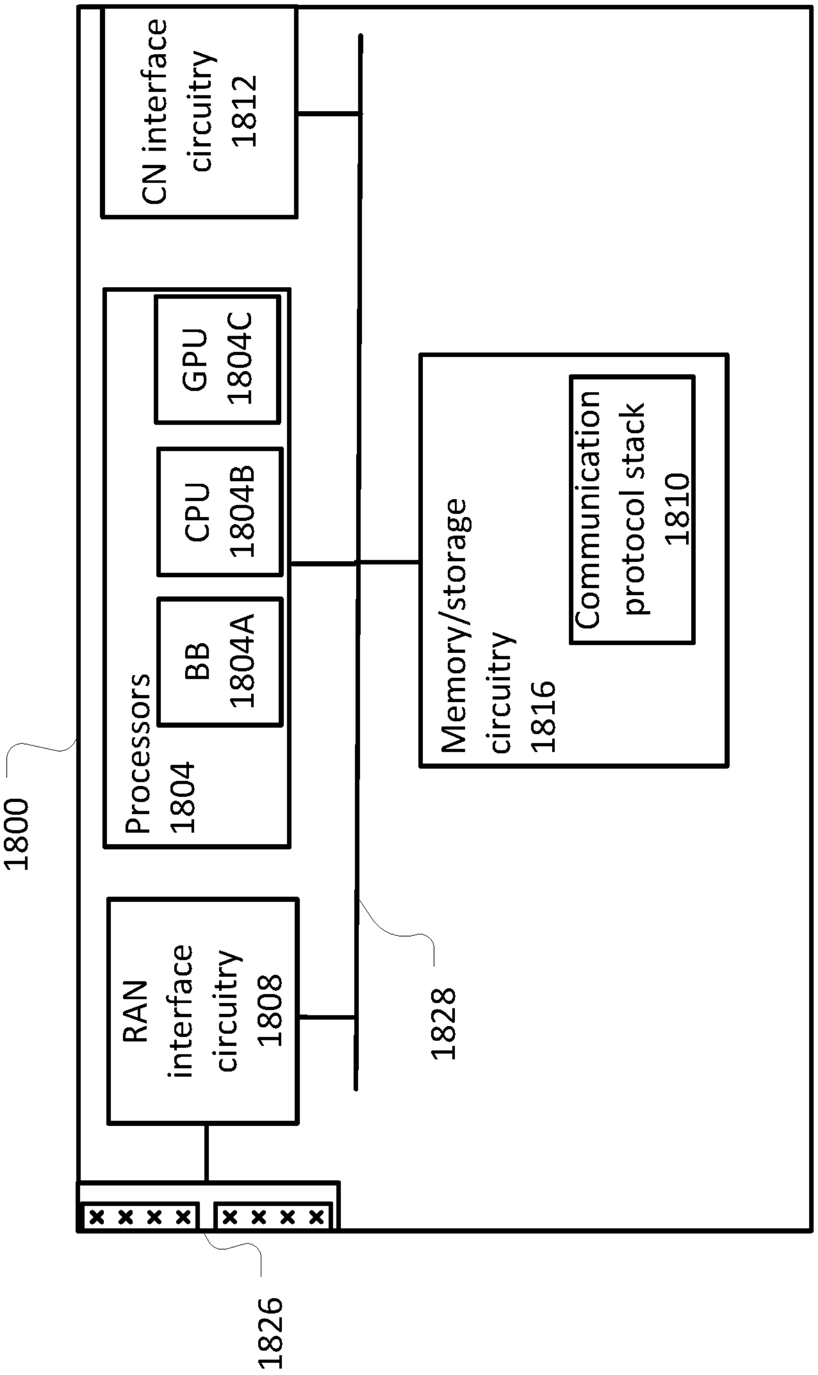
FIG. 18 illustrates an example next generation NodeB (gNB) in accordance with some embodiments.

FIG. 1 illustrates an example MBS broadcast configuration instance 100 in accordance with some embodiments. In particular, FIG. 1 illustrates an example MBS broadcast configuration instance 100 for configuring a UE 102 to receive broadcast transmissions transmitted by a base station 104. The UE 102 may include one or more of the features of the UE 1700 (FIG. 17). The base station 104 may include one or more features of the next generation nodeB (gNB) 1800 (FIG. 18).

Figure 2:
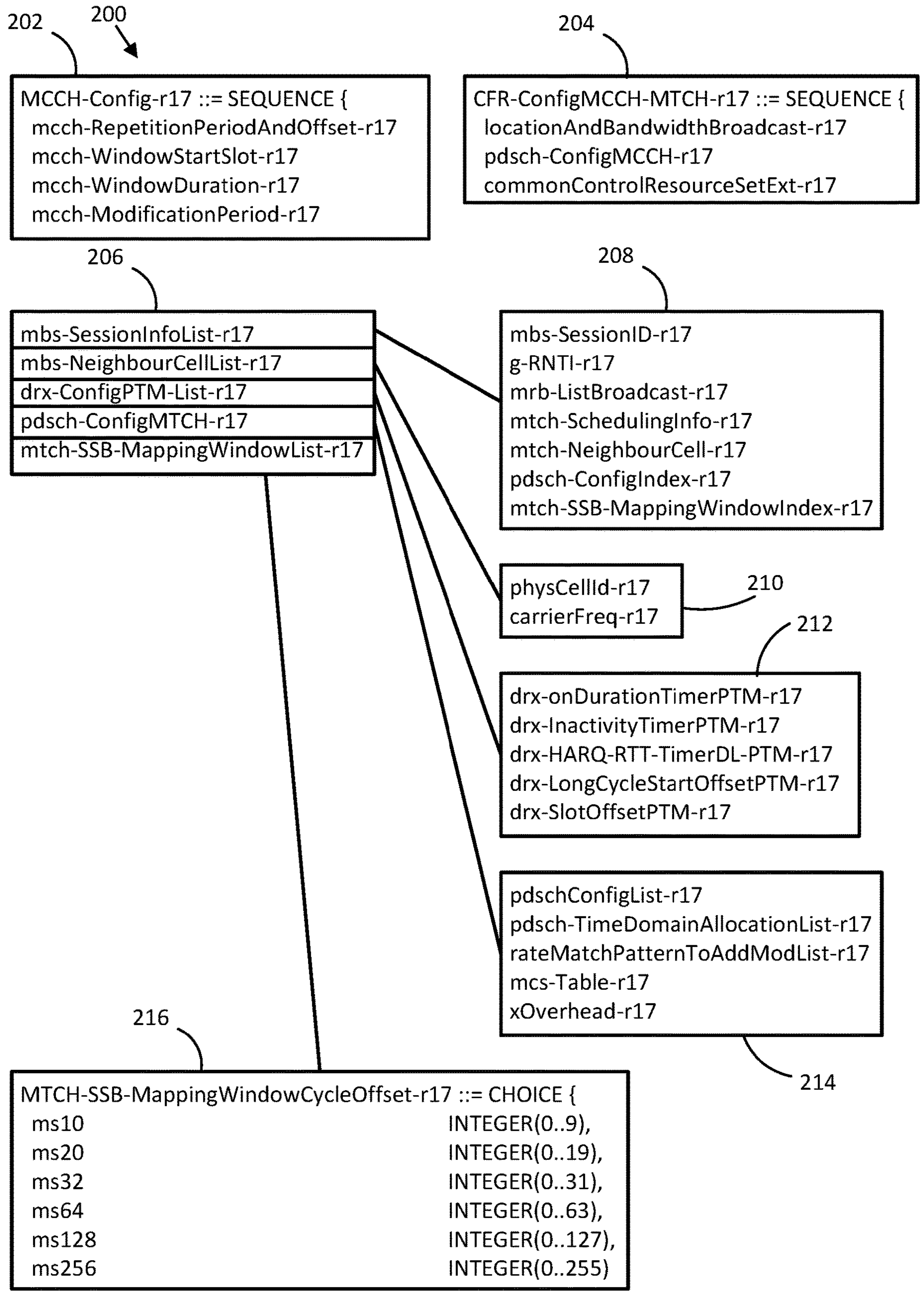
FIG. 2 illustrates example information elements that may be exchanged as part of the MBS broadcast configuration instance of FIG. 1 in accordance with some embodiments.

The MBS broadcast configuration instance 100 is represented by a signaling diagram illustrating transmissions that may be exchanged between the UE 102 and the base station 104 to configure the UE 102 for receiving broadcast transmissions from the base station 104. FIG. 2 illustrates example information elements 200 that may be exchanged as part of the MBS broadcast configuration instance 100 in accordance with some embodiments.

In the illustrated embodiment, the UE 102 may be set to receive broadcast transmissions transmitted by the base station 104, as indicated by 106. However, the UE 102 may be unable to process the broadcast transmissions from the base station 104 until the UE 102 is configured to receive the broadcast transmissions from the base station 104. Accordingly, a configuration procedure may be performed to configure the UE 102 for receiving and processing the broadcast transmissions.

A 2-step MBS broadcast configuration acquisition may be performed for the UE 102 in RRC_CONNECTED/IDLE/INACTIVE state. For example, the procedure for configuring the UE 102 to receive broadcast transmissions from the base station 104 while in the RRC_CONNECTED, the RRC_IDLE, and the RRC_INACTIVE may involve two acquisition steps by the UE. The UE 102 may receive the MBS configuration for broadcast session via a multicast/broadcast services control channel (MCCH). The MBS configuration may omit a multicast session configuration in these embodiments. The UE 102 may receive the MCCH according to the MCCH configuration which is provided in a system information block type X (SIBx).

The base station 104 may transmit an SIBx 108 to the UE 102. The SIBx 108 may comprise an RRC transmission. The SIBx 108 may include configuration information for an MCCH of the base station 104. The SIBx 108 may include an MCCH-Config information element and/or a cfr-ConfigMCCH-MTCH information element that can be utilized for configuring the UE 102 to receive transmissions via the MCCH of the base station 104.

The information elements 200 include an example MCCH-Config information element 202 that may be included in the SIBx 108 in accordance with some embodiments. The MCCH-Config information element 202 may provide data that can be utilized for configuring the UE 102 to receive and process transmissions via the MCCH of the base station 104. For example, the MCCH-Config information element 202 may include a repetition period and offset indication corresponding to the MCCH, a window start slot indication corresponding to the MCCH, a window duration indication corresponding to the MCCH, and/or a modification period indication corresponding to the MCCH. The UE 102 may receive the MCCH-Config information element 202 in the SIBx 108 and may determine the repetition period and offset, the window start slot, the window duration, and/or the modification period for the MCCH.

The information elements 200 include a cfr-ConfigMCCH-MTCH information element 204 that may be included in the SIBx 108 in accordance with some embodiments. The cfr-ConfigMCCH-MTCH information element 204 may provide data that can be utilized for configuring the UE 102 to receive and process transmissions via the MCCH of the base station 104. For example, the cfr-ConfigMCCH-MTCH may include data utilized to configure a common frequency resource used for MCCH and/or multicast traffic channel (MTCH) reception. In some embodiments, the cfr-ConfigMCCH-MTCH information element 204 may include a location and bandwidth broadcast indication corresponding to the MCCH, a physical downlink shared channel (PDSCH) configuration indication corresponding to the MCCH, and/or a common control resource set extension indication corresponding to the MCCH. The UE 102 may receive the cfr-ConfigMCCH-MTCH information element 204 in the SIBx 108 and may determine the location and bandwidth, the PDSCH configuration, and/or the common control resource set extension for the MCCH.

The UE 102 may be configured for reception of transmissions via the MCCH of the base station 104 based on the SIBx 108. For example, the UE 102 may utilize the data from the information elements included in the SIBx 108 to configure the UE 102 to receive and process transmissions received via the MCCH of the base station.

Once the UE 102 has been configured to receive and process transmissions via the MCCH of the base station 104, the UE 102 may receive one or more MCCH transmissions from the base station 104. For example, the base station 104 may transmit MCCH transmissions 110. The base station 104 may broadcast the MCCH transmission 110 via the MCCH of the base station 104.

The base station 104 may provide the MBS broadcast configuration in MCCH. For example, the base station 104 may provide data regarding the MBS broadcast configuration in the MCCH transmissions 110. The MCCH provides the list of all broadcast services with ongoing sessions transmitted on MTCH(s) and the associated information for broadcast session (e.g., MBS session identifier (ID), global system for mobile communication EDGE radio access network radio network temporary identifier (G-RNTI) and scheduling info, neighbor cell info for MTCH). For example, the base station 104 may provide transmissions that include the list of all broadcast services with ongoing sessions transmitted on the MTCH and the associated information broadcast session via the MCCH.

The MCCH transmissions 110 may include one or more messages transmitted via the MCCH of the base station 104. The UE 102 may establish one or more broadcast MBS radio bearers based on the MCCH transmissions 110 as indicated by 112. Further, the UE 102 may establish a service data adaptation protocol (SDAP) entity, a packet data convergence protocol (PDCP) entity, and/or a radio link control entity based on the MCCH transmissions 110. The UE 102 may further apply the physical layer (PHY) configuration and/or inform the upper layer about the TMGI based on the MCCH transmissions 110.

The base station 104 may provide a first transmission 114 of the MCCH transmissions 110. The first transmission 114 may cause the physical downlink control channel (PDCCH) to be scheduled with MCCH-radio network temporary identifier (RNTI).

The base station 104 may provide a second transmission 116 of the MCCH transmissions 110. The second transmission 116 may include an MBS broadcast configuration for configuring the UE 102 to receive and process broadcast signals transmitted by the base station 104. The second transmission 116 may be transmitted via the MCCH or a physical downlink shared channel (PDSCH) of the base station 104.

The second transmission 116 may include an information element 206 that provides data for configuring the UE 102 to receive and process transmissions broadcast by the base station 104. The information element 206 may include a session information list, a neighbour cell list, a configuration PTM list, a MTCH configuration, and/or a mapping window list.

The session information list of the information element 206 may comprise a session list information element 208. The session list information element 208 may include a session ID, an RNTI, a broadcast list, scheduling information, a neighbour cell indication, a configuration index, and/or a mapping window index. The UE 102 may utilize the session list information element 208 to determine a session list corresponding to the base station 104.

The neighbour cell list of the information element 206 may comprise a neighbour cell list information element 210. The neighbour cell list information element 210 may include a physical cell ID and/or a carrier frequency. The UE 102 may utilize the neighbour cell list information element 210 to determine neighbour cell information related to the base station 104.

The configuration PTM list of the information element 206 may include a PTM configuration element 212. The PTM configuration element 212 may include a PTM on duration timer indication, a PTM activity timer indication, a PTM hybrid automatic repeat request (HARQ) round-trip time (RTT) downlink (DL) timer indication, a PTM long cycle start offset indication, and/or a PTM slot offset indication. The UE 102 may utilize the PTM configuration element 212 to determine a configuration for PTM related to the base station 104.

The MTCH configuration of the information element 206 may include an MTCH configuration information element 214. The MTCH configuration information element 214 may include a PDSCH configuration list, a time domain allocation list for the PDSCH, a rate match pattern to add mod list indication, a modulation and coding scheme (MCS) table, and/or an overhead indication. The UE 102 may utilize the MTCH configuration information element 214 to determine a configuration of the MTCH of the base station 104.

The mapping window list of the information element 206 may include a mapping window cycle offset information element 216. The mapping window cycle offset information element 216 may indicate a cycle offset for a mapping window. The UE 102 may utilize the mapping window cycle offset information element 216 to determine a mapping window for a synchronization signal/physical broadcast channel block (SSB) corresponding to the base station 104.

The UE 102 may be configured for receiving and processing transmissions broadcast by the base station 104 based on the MCCH transmissions 110. For example, the base station 104 may transmit one or more broadcast MBS service transmissions 118. The UE 102 may receive the one or more broadcast MBS service transmissions 118 and may process the broadcast MBS service transmissions 118 based on the UE 102 being configured for receiving and processing the broadcast transmissions.

Figure 3:
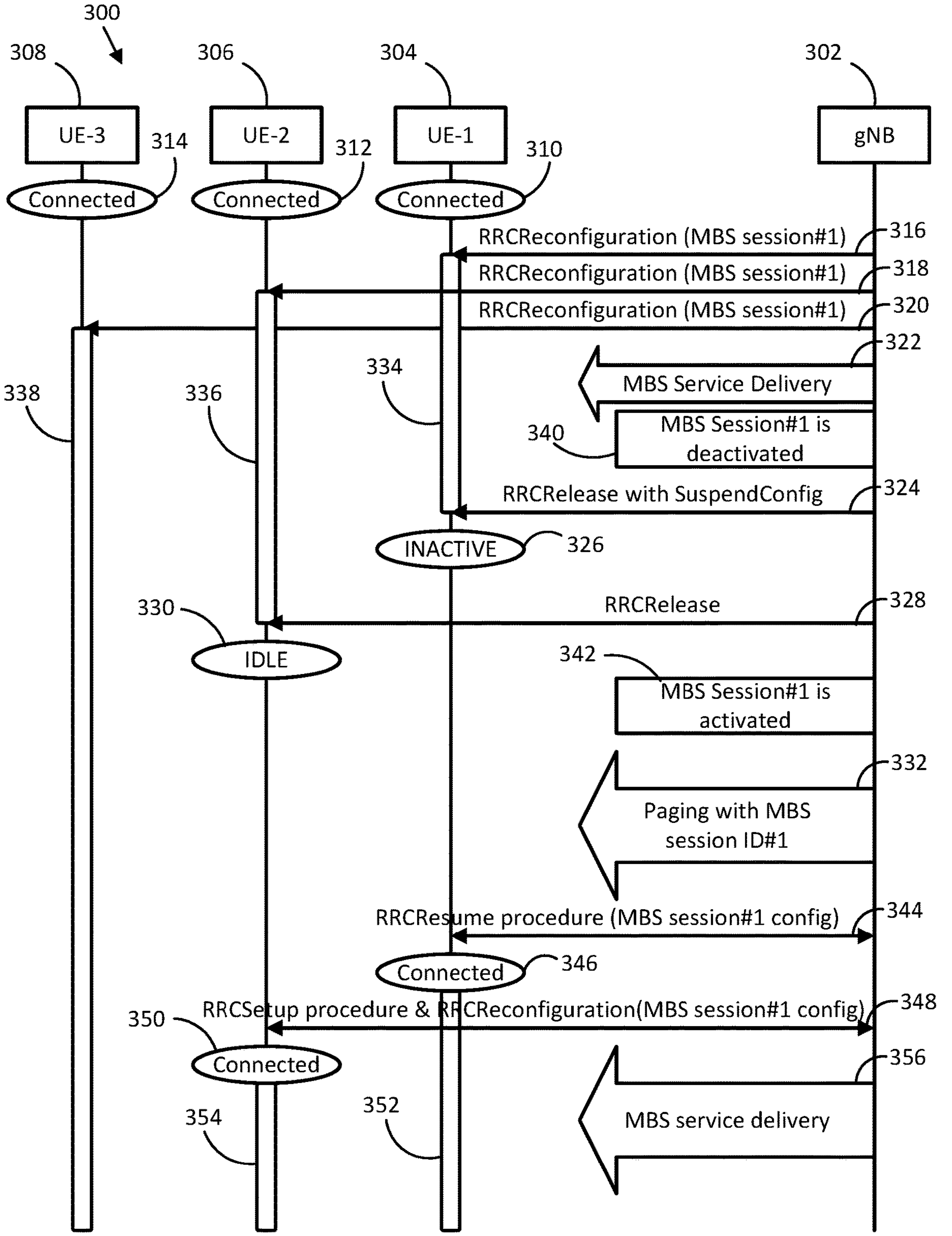
FIG. 3 illustrates an example multicast MBS control representation in accordance with some embodiments.

FIG. 3 illustrates an example multicast MBS control representation 300 in accordance with some embodiments. For example, the multicast MBS control representation 300 illustrates some example control operations related to multicast MBS that may be implemented by a system. The multicast MBS control representation 300 is illustrated by a signal diagram between a base station 302 a plurality of UEs.

The multicast MBS control representation 300 includes a base station 302. The base station 302 may include one or more of the features of the gNB 1800 (FIG. 18). The multicast MBS control representation 300 includes a first UE 304, a second UE 306, and a third UE 308. Each of the first UE 304, the second UE 306, and the third UE 308 may include one or more of the features of the UE 1700 (FIG. 17).

When the RRC_CONNECTED UE joins the multicast session, the network (NW) may send a RRC Reconfiguration message with relevant MBS configuration for the multicast session to the UE. For example, the first UE 304 may be RRC connected to the base station 302 as indicated by connected 310. The second UE 306 may be RRC connected to the base station 302 as indicated by connected 312. The third UE 308 may be RRC connected to the base station 302 as indicated by connected 314.

The base station 302 may transmit an RRC reconfiguration message 316 to the first UE 304. The RRC reconfiguration message 316 may include a relevant MBS configuration for a multicast session of the first UE 304. In the illustrated embodiment, the RRC reconfiguration message 316 indicates that the first UE 304 is configured for an MBS session #1. The first UE 304 may be configured for the MBS session #1 based on the RRC reconfiguration message 316.

The base station 302 may transmit an RRC reconfiguration message 318 to the second UE 306. The RRC reconfiguration message 318 may include a relevant MBS configuration for a multicast session of the second UE 306. In the illustrated embodiment, the RRC reconfiguration message 318 indicates that the second UE 306 is configured for the MBS session #1. The second UE 306 may be configured for the MBS session #1 based on the RRC reconfiguration message 318.

The base station 302 may transmit an RRC reconfiguration message 320 to the third UE 308. The RRC reconfiguration message 320 may include a relevant MBS configuration for a multicast session of the third UE 308. In the illustrated embodiment, the RRC reconfiguration message 320 indicates that the third UE 308 is configured for the MBS session #1. The third UE 308 may be configured for the MBS session #1 based on the RRC reconfiguration message 320.

Once the first UE 304, the second UE 306, and third UE 308 have been configured for the MBS session #1, the first UE 304, the second UE 306, and the third UE 308 may receive transmissions multicast by the base station 302 related to the MBS session #1. For example, the base station 302 may multicast MBS service delivery 322. The first UE 304, the second UE 306, and the third UE 308 may receive the MBS service delivery 322 and process the MBS service delivery 322. The first UE 304 may monitor and receive MBS service during a time indicated by 334. The second UE 306 may monitor and receive MBS service during a time indicated by 336. The third UE 308 may monitor and receive MBS service during a time indicated by 338.

The base station 302 may be able to deactivate MBS sessions. For example, the base station 302 may deactivate MBS session #1 after the MBS service delivery 322 as indicated by 340.

When the multicast session is deactivated, NW may release the UEs who join this session into IDLE/INACTIVE state. For example, the base station 302 may transmit messages to the UEs that joined the MBS session #1 to transition the UEs to an idle state, and/or an inactive state.

The base station 302 may transmit an RRC release with suspend configuration message 324 to the first UE 304. The RRC release with suspend configuration message 324 may indicate that the first UE 304 is to transition to an inactive state. The first UE 304 may transition to the inactive state based on the RRC release with suspend configuration message 324 as indicated by inactive 326. The first UE 304 may stop monitoring and receiving MBS service from the base station 302 based on the first UE 304 receiving the RRC release with suspend configuration message 324 as indicated by 334 ending when the RRC release with suspend configuration message 324 is received by the first UE 304. The first UE 304 may not monitor and receive the MBS service from the base station 302 until the first UE 304 transitions back to the connected state.

The base station 302 may transmit an RRC release message 328 to the second UE 306. The RRC release message 328 may indicate that the second UE 306 is to transition to an idle state. The second UE 306 may transition to the idle state based on the RRC release message 328 as indicated by idle 330. The second UE 306 may stop monitoring and receiving MBS service from the base station 302 based on the second UE 306 receiving the RRC release message 328 as indicated by 336 ending when the RRC release message 325 is received by the second UE 306. The second UE 306 may not monitor and receive the MBS service from the base station 302 until the second UE 306 transitions back to the connected state.

When the multicast session is activated, NW informs the IDLE/INACTIVE UE about the multicast session activation via the paging mechanism. For the gNBs supporting MBS, the paging message contains the MBS session ID to address all IDLE/INACTIVE UEs that joined the MBS multicast session. The paging is for group notification. For example, the UEs are not paged individually. For the gNBs not supporting MBS, the paging message is for each UE individually, as the core network (CN) initiated paging as legacy.

For example, the base station 302 may activate MBS session #1 as indicated by 342. The base station 302 may transmit a paging transmission 332. The paging transmission 332 may include an MBS session ID to address the UEs in the idle state and/or the inactive state that previously joined the MBS session corresponding to the MBS session ID. In the illustrated embodiment, the paging transmission 332 includes an MBS session ID #1. The paging transmission 332 may address UEs in the idle state and/or the inactive state that had joined MBS session #1. In instances where the base station 302 supports MBS, the paging transmission 332 may be transmitted for group notification. In instances where the base station 302 does not support MBS, the paging transmission 332 may be transmitted to each of the UEs individually.

The base station 302 may transmit perform an RRC resume procedure 344 with the first UE 304. The RRC resume procedure 344 may configure the first UE 304 for MBS session #1. The first UE 304 may transition to the connected state based on the RRC resume procedure 344 as indicated by 346. The first UE 304 may monitor and receive MBS service from the base station 302 after the transition to the connected state as indicated by 352.

The base station 302 may transmit perform an RRC setup procedure and RRC reconfiguration 348 with the second UE 306. The RRC setup procedure and RRC reconfiguration 348 may configure the second UE 306 for MBS session #1. The second UE 306 may transition to the connected state based on the RRC setup procedure and RRC reconfiguration 348 as indicated by 350. The second UE 306 may monitor and receive MBS service from the base station 302 after the transition to the connected state as indicated by 354.

The base station 302 may multicast MBS service delivery 356. The first UE 304, the second UE 306, and the third UE 308 may receive the MBS service delivery 356 and process the MBS service delivery 356.

As can be seen by FIG. 3, the UEs monitor and receive MBS services while the UEs are in the connected state. However, the UEs do not monitor and receive MBS services while the UEs are in the inactive and idle states. This can cause the UEs to miss any MBS services transmitted while the UEs are in the inactive and idle states, which can be undesirable.

During legacy MBS multicast configuration, the NW only provides the configuration for MBS multicast via the RRCReconfiguration message. The MBS multicast configuration includes the following parts. FIG. 4 illustrates a first portion of example information elements utilized for MBS multicast configuration in accordance with some embodiments. FIG. 5 illustrates a second portion of example information elements utilized for MBS multicast configuration in accordance with some embodiments. FIG. 6 illustrates a third portion of example information elements utilized for MBS multicast configuration in accordance with some embodiments.

Part 1 for the MBS multicast configuration is multicast session/multicast radio bearer (MRB) configuration in RadioBearerConfig. The MRB configuration in RadioBearerConfig may include an MRB to add information element 402 of FIG. 4 that provides data regarding the MRB configuration. The MRB to add information element 402 may provide data for a UE to configure the MRB for MBS multicast.

Part 2 for the MBS multicast configuration is PTM related G-RNTI and discontinuous reception (DRX) configuration in MAC-CellGroupConfig. The PTM related G-RNTI and DRX configuration may include a cell group configuration information element 404 of FIG. 4, an RNTI specific configuration information element 502 of FIG. 5, and/or a DRX PTM configuration information element 602 of FIG. 6. The cell group configuration information element 404, the RNTI specific configuration information element 502 and/or the DRX PTM configuration information element 602 may provide data for a UE to configure G-RNTI and DRX for MBS multicast.

Part 3 for the MBS multicast configuration is PTM PDCCH/PDSCH configuration in crest factor reduction (CFR) configuration within each BWP DL configuration. The PTM PDCCH/PDSCH configuration may include a BWP downlink dedicated information element 504 of FIG. 5. The BWP downlink dedicated information element 504 may provide data for a UE to configure PDCCH/PDSCH for MBS multicast.

Part 4 for the MBS multicast configuration is some HARQ feedback related configuration in the bandwidth part (BWP) configuration. The HARQ feedback related configuration may be configured based on one or more of the MRB to add information element 402, the cell group configuration information element 404, the RNTI specific configuration information element 502, BWP downlink dedicated information element 504, and/or a DRX PTM configuration information element 602 of FIG. 6 For legacy systems, all four parts were needed by a UE to receive and process multicast messages transmitted by a base station.

In release 17 (R17) MBS configuration, for MBS multicast service, only the CONNECTED UE who completes the MBS multicast authentication and joins multicast session via non-access stratum (NAS) procedure to CN can receive the data of the joint session. The NW provides the configuration via the RRC dedicated signaling, which has the security protection. For MBS broadcast service, all the UEs can receive the interested MBS service. The NW provides the configuration via the MTCH broadcast configuration on MCCH channel, which is provided via the broadcast way without security protection.

For release 18 (R18) MBS multicast reception in INACTIVE state may consider the mixed approach for the multicast configuration/reconfiguration provision. The dedicated RRC signalling may be used for switching a multicast receiving UE from RRC_CONNECTED to RRC_INACTIVE and continue multicast reception. MCCH may be used in case there is a need to indicate a PTM configuration in case there is a need for change in PTM config or during mobility beyond serving cell/gNB.

For R18 multicast PTM configuration via MCCH channel, the UE may not be able to acquire the multicast configuration and perform the data reception accordingly if it has not authenticated for the multicast session reception or has not joined the MBS multicast session. But the MBS configuration via MCCH channel has no security protection, and any UE within the cell can acquire the configuration. This can be a weak point that can be taken advantage of by bad actors. To ensure a more secure multicast configuration via MCCH channel, some enhancements may be utilized as described throughout this disclosure.

An idea behind at least some of the approaches described herein may be to not allow UEs to obtain the multicast PTM configuration for free.

Approaches of the multicast PTM configuration via MCCH for INACTIVE UE are presented herein. In a first approach, a NW only provides partial multicast configuration via the MCCH channel. For example, multicast configuration may be divided into two parts. A first part of the multicast configuration may be provided via the RRC dedicated signaling. A second part of the multicast configuration may be provided via an MCCH.

In a second approach, a NW only provides the index of the multicast PTM configuration via the MCCH channel. For example, multiple candidate multicast PTM configurations may be provided to UE in advance. The NW may then inform the configuration ID/index to the UE via the MCCH channel for the multicast PTM configuration to be implemented.

In a third approach, UE dedicated configuration of MCCH channel for multicast configuration may be performed. The configuration of MCCH channel is not provided via broadcast way, but via UE dedicated signaling.

In a fourth approach, some security scheme may be applied for the MBS multicast configuration which is transmitted via MCCH channel. The multicast configuration via MCCH channel may be provided in the secured method, such as ciphering, or signature, or integrity protected. NW may provide part or all parameters for security checking via the RRC dedicated signaling.

Whether to provide the multicast PTM configuration via MCCH channel may depend on UE capability or UE preference. UE can indicate whether UE supports or UE prefers to receive the reconfiguration via the MCCH channel. If not, NW may provide the reconfiguration via RRC dedicated signaling.

Figure 7:
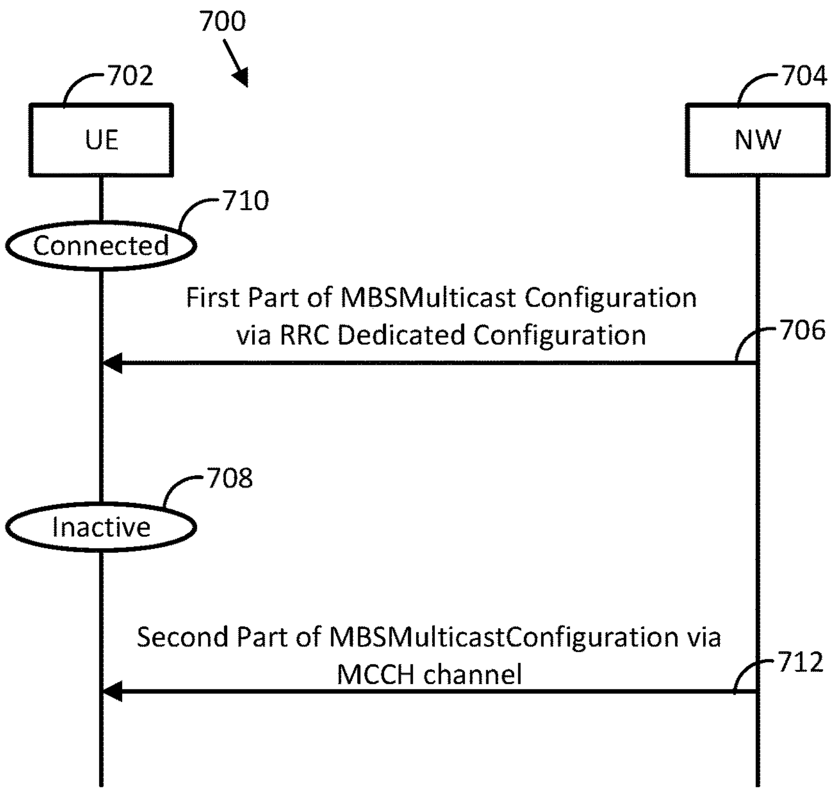
FIG. 7 illustrates an example signaling chart showing multicast configuration via the first approach in accordance with some embodiments.

For the first approach involving partial multicast configuration via MCCH, the NW does not provide all parts to UE via MCCH channel. FIG. 7 illustrates an example signaling chart 700 showing multicast configuration via the first approach in accordance with some embodiments. For example, the signaling chart 700 illustrates messages that may be exchanged for the partial multicast configuration approach.

The multicast configuration for INACTIVE reception may include 3 parts. Part 1 may include MRB configuration in RadioBearerConfig. Part 2 may include a PTM related MAC configuration. For example, Part 2 may comprise a PTM related G-RNTI and DRX configuration in MACCellGroupConfig in some embodiments. Part 3 may include a PTM related PHY configuration. For example, Part 3 may comprise a PTM PDCCH/PDSCH configuration in CFR configuration within each BWP DL configuration in some embodiments.

The provisioning of each part of the configuration may be as follows. For part 1, the multicast session/MRB configuration may be provided via RRC dedicated configuration. For the session/MRB related reconfiguration, NW may ask UE back to CONNECTED mode and provide the reconfiguration via UE dedicated RRC signaling. For example, the NW may perform an RRC resume procedure (such as the RRC resume procedure 344 (FIG. 3)) and/or an RRC setup procedure (such as the RRC setup procedure and RRC reconfiguration 348 (FIG. 3)) to transition the UE back to a connected state. The session/radio bearer (RB) related configuration may be tightly related to the UE MBS session joint NAS procedure, which may only be performed via RRC dedicated signaling. Therefore, it is sufficient to change the multicast session/MRB configuration via UE dedicated signaling.

For part 2, MAC related scheduling/DRX configuration can be via RRC dedicated configuration or via MCCH channel. For option 1, the reconfiguration may be restricted via RRC dedicated configuration. DRX/scheduling pattern may be determined according to a quality of service (QOS) requirement of MBS multicast service. Therefore, no multicast service change means no QoS requirement change and no scheduling/DRX pattern change. For option 2, part of the parameters can be reconfiguration via MCCH channel, for example, DRX offset. For example, adjustment may be needed according to the data arrival time. For option 3, the reconfiguration can be via MCCH channel. For option 4, the above 3 options, can be predefined or preconfigured by RRC via the UE dedicated RRC signaling.

For part 3, PTM PDCCH/PDSCH configuration in CFR can be reconfigured via MCCH channel. The detailed physical layer (PHY) resource may be changed for the data transmission.

The signaling chart 700 may include a UE 702 and a base station 704. The UE 702 may include one or more of the features of the first UE 304 (FIG. 3), the second UE 306 (FIG. 3), the third UE 308 (FIG. 3), and/or the UE 1700 (FIG. 17). The base station 704 may include one or more of the features of the base station 302 (FIG. 3), and/or the gNB 1800 (FIG. 18). The signaling chart 700 illustrates example messages that may be exchanged between the UE 702 and the base station 704 to configure the UE 702 for MBS multicast transmissions from the base station 704 while the UE 702 is in an inactive state.

The UE 702 may be in a connected state, as indicated by 710. The base station 704 may transmit an RRC dedicated message 706 to the UE 702 while the UE 702 is in the connected state. The RRC dedicated message 706 may include a first part of MBS multicast configuration for the UE 702.

The RRC dedicated message 706 may include the parts as described above. The parts included in the RRC dedicated message 706 may depend on the option being implemented. In option 1, the RRC dedicated message 706 may include the multicast session/MRB configuration and the MAC related scheduling/DRX configuration. In option 2, the RRC dedicated message 706 may include the multicast session/MRB configuration and a first portion of the MAC related scheduling/DRX configuration. In option 3, the RRC dedicated message may include the multicast session/MRB configuration. In option 4, the elements to be included in the RRC dedicated message 706 may be the elements of option 1, the elements of option 2, or the elements of option 3 as predefined or preconfigured via UE dedicated RRC signaling.

The UE 702 may be transitioned to an inactive state after the RRC dedicated message 706 in some embodiments, as indicated by 708. The base station 704 may transmit an MCCH message 712, via an MCCH of the base station 704, to UE 702 while the UE 702 in in the inactive state. The MCCH message 712 may include a second part of the MBS multicast configuration for the UE 702.

The MCCH message 712 may include the parts as described above. The parts included in the MCCH message 712 may depend on the option being implemented. In option 1, the MCCH message 712 may include the PTM PDCCH/PDSCH configuration in CFR. In option 2, the MCCH message 712 may include the PTM PDCCH/PDSCH configuration in CFR and a second portion of the MAC related scheduling/DRX configuration. In option 3, the MCCH message 712 may include the PTM PDCCH/PDSCH configuration in CFR and the MAC related scheduling/DRX configuration. In option 4, the elements to be included in the MCCH message 712 may be the elements of option 1, the elements of option 2, or the elements of option 3 as predefined or preconfigured via UE dedicated RRC signaling.

As the three parts for multicast configuration are separated between the RRC dedicated message 706 and the MCCH message 712, a UE needs to receive both the RRC dedicated message 706 and the MCCH message 712 to be configured to properly receive multicast transmissions from the base station 704. As the RRC dedicated message 706 is protected from access by UEs other than the UE 702, the UE 702 may be the only UE that can receive both the RRC dedicated message 706 and the MCCH message 712. Accordingly, the partial multicast configuration approach may provide protection against bad actors.

For the second approach, a multicast configuration index may be provided via MCCH to indicate the multicast PTM configuration to be implemented. For example, the NW can provide multiple multicast PTM configurations to a UE via UE dedicated signaling as the candidate configuration set. When the configuration is changed, NW can indicate the new configuration via the config index transmitted to the UE. If the UE cannot find the indicated index, the UE can initiate an RRCResume procedure (such as the RRC resume procedure 344 (FIG. 3) to transition back to CONNECTED mode, and inform the information to NW. The information provided to the NW may indicate that the UE could not find the indicated index. The NW may provide the correct configuration to UE later based on being informed of the information.

Figure 8:
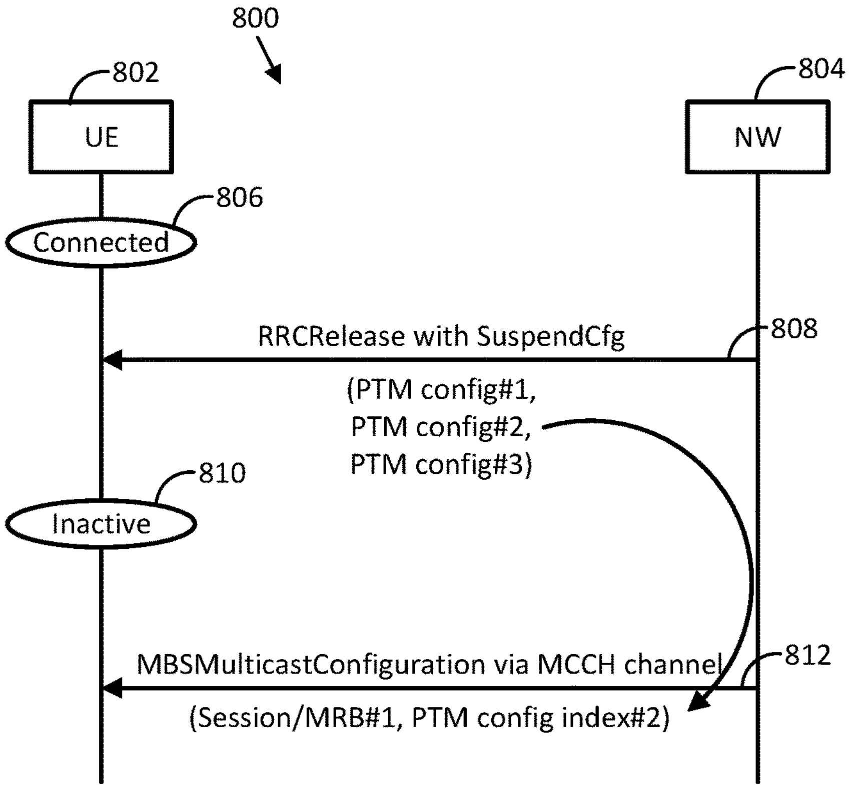
FIG. 8 illustrates an example signaling chart showing multicast configuration via the second approach in accordance with some embodiments.

FIG. 8 illustrates an example signaling chart 800 showing multicast configuration via the second approach in accordance with some embodiments. For example, the signaling chart illustrates messages that may be exchanged for the multicast configuration index approach.

The signaling chart 800 may include a UE 802 and a base station 804. The UE 802 may include one or more of the features of the first UE 304 (FIG. 3), the second UE 306 (FIG. 3), the third UE 308 (FIG. 3), the UE 702 (FIG. 7), and/or the UE 1700 (FIG. 17). The base station 804 may include one or more of the features of the base station 302 (FIG. 3), the base station 704 (FIG. 7), and/or the gNB 1800 (FIG. 18). The signaling chart 800 illustrates example messages that may be exchanged between the UE 802 and the base station 804 to configure the UE 802 for MBS multicast transmissions from the base station 804 while the UE 802 is in an inactive state.

The UE 802 may be in a connected state as indicated by 806. The base station 804 may transmit an RRC dedicated message 808 to the UE 802 while the UE 802 is in the connected state. The RRC dedicated message 808 may comprise an RRC release message with suspend configuration (such as the RRC release with suspend configuration message 324 (FIG. 3)) The RRC dedicated message 808 may include a candidate configuration set. The candidate configuration set may include one or more multicast PTM configurations that can be utilized by the UE 802. Each of the multicast PTM configurations may have a corresponding configuration index. In the illustrated embodiment, the RRC dedicated message 808 includes PTM configuration #1, PTM configuration #2, and PTM configuration #3. The UE 802 may receive the RRC dedicated message 808 and store the PTM configurations included in the candidate configuration set of the RRC dedicated message 808.

The UE 802 may be transitioned to an inactive state after the RRC dedicated message 808, as indicated by 810. The base station 804 may transmit an MCCH message 812, via an MCCH of the base station 804, to the UE 802 while the UE 802 is in the inactive state. The MCCH message 812 may include a configuration index corresponding to a PTM configuration to be implemented by the UE 802.

The UE 802 may receive the MCCH message 812 and identify the configuration index included in the MCCH message 812. The UE 802 may compare the configuration index from the MCCH message 812 to the configuration indexes corresponding to the PTM configurations stored from the RRC dedicated message 808. If the UE 802 determines that the configuration index from the MCCH message 812 matches one of the configuration indexes of the stored PTM configurations, the UE 802 may be configured with the PTM configuration corresponding to the configuration index. If the UE 802 determines that the configuration index from the MCCH message 812 does not match any of the configuration indexes of the stored PTM configurations, the UE 802 may transmit a message to the base station 804 that indicates the UE 802 could not find the indicated configuration index. In the illustrated embodiment, the MCCH message 812 may indicate the configuration index of 2. The UE 802 may determine that the indicated configuration index corresponds to PTM configuration #2 and may be configured with PTM configuration #2 based on the MCCH message 812.

Access to the RRC dedicated message 808 may be limited to the UE 802 and other UEs may be unable to access the RRC dedicated message 808. As the RRC dedicated message 808 includes the PTM configurations, the other UEs may not be aware of the PTM configurations that can be implemented for receiving multicast transmissions from the base station. Accordingly, protection is protected from bad actors due to the other UEs being unaware of the PTM configurations.

For the third approach involving MCCH configuration via non-broadcast way, the NW can provide the configuration for UE to receive the data via MCCH channel in accordance with one of the following options. For option 1, the NW can provide the configuration for the UE via the UE dedicated signaling. For option 2, the NW can provide part of the MCCH configuration via the UE dedicated signaling, and the other part of the MCCH configuration via broadcast. For option 3, the NW can provide multiple MCCH configurations via UE dedicated signaling, and indicate the MCCH config index (for PDSCH reception) in the scheduling downlink control information (DCI).

The UE may follow the MCCH channel to receive the multicast PTM configuration via MCCH channel. For example, once the UE has been configured for receiving data via the MCCH channel in accordance with one of the options, the UE may monitor the MCCH channel for a multicast PTM configuration for configuring the UE.

Access to the RRC dedicated message 808 may be limited to the UE 802 and other UEs may be unable to access the RRC dedicated message 808. As the RRC dedicated message 808 includes the PTM configurations, the other UEs may not be aware of the PTM configurations that can be implemented for receiving multicast transmissions from the base station. Accordingly, protection is protected from bad actors due to the other UEs being unaware of the PTM configurations.

Figure 9:
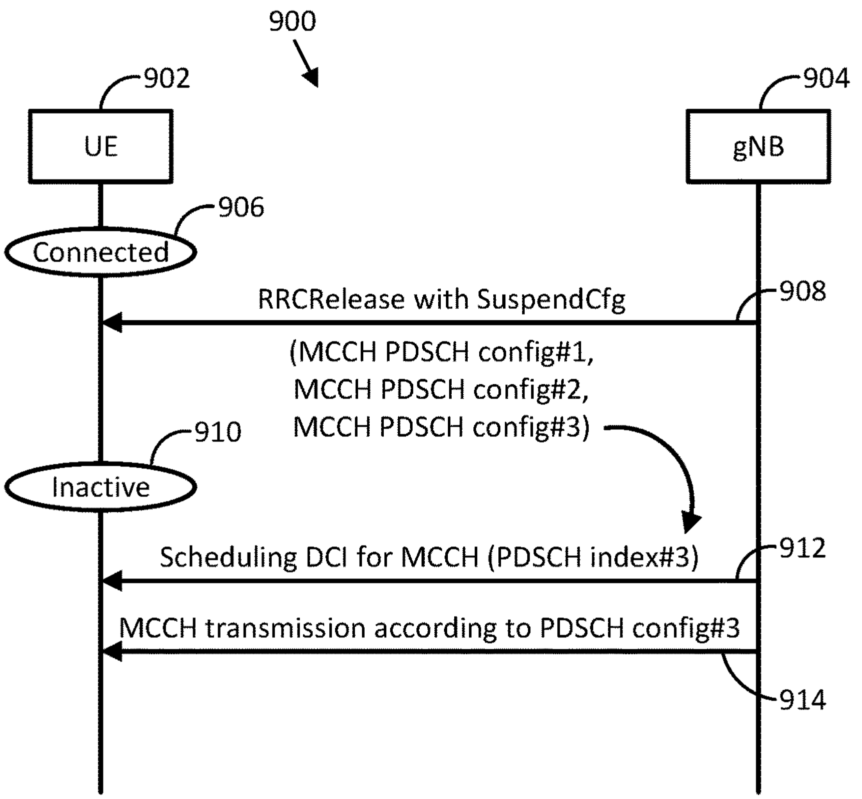
FIG. 9 illustrates an example signaling chart showing multicast configuration via the third approach in accordance with some embodiments.

FIG. 9 illustrates an example signaling chart 900 showing multicast configuration via the third approach in accordance with some embodiments. For example, the signaling chart 900 illustrates signals that may be exchanged for the MCCH configuration via a non-broadcast approach.

The signaling chart 900 may include a UE 902 and a base station 904. The UE 902 may include one or more of the features of the first UE 304 (FIG. 3), the second UE 306 (FIG. 3), the third UE 308 (FIG. 3), the UE 702 (FIG. 7), the UE 802 (FIG. 8), and/or the UE 1700 (FIG. 17). The base station 904 may include one or more of the features of the base station 302 (FIG. 3), the base station 704 (FIG. 7), the base station 804 (FIG. 8), and/or the gNB 1800 (FIG. 18). The signaling chart 900 illustrates example messages that may be exchanged between the UE 902 and the base station 904 to configure the UE 902 for MBS multicast transmissions from the base station 904.

The UE 902 may be in a connected state, as indicated by 906. The base station 904 may transmit an RRC dedicated message 908 to the UE 902 while the UE 902 is in the connected state. In option 1, the RRC dedicated message 908 may include an MCCH configuration for the UE 902. The UE 902 may be configured with the indicated MCCH configuration from the RRC dedicated message 908 in option 1. In option 2, the RRC dedicated message 908 may include a first part of an MCCH configuration for the UE 902. In option 3, the RRC dedicated message 908 may include one or more MCCH configurations that can be implemented by the UE 902. In some embodiments, the RRC dedicated message 908 may comprise an RRC release with suspend configuration message (such as the RRC release with suspend configuration message 324 (FIG. 3)).

The illustrated embodiment of the signaling chart 900 implements option 3. In particular, the RRC dedicated message 908 includes an MCCH PDSCH configuration #1, an MCCH PDSCH configuration #2, and an MCCH PDSCH configuration #3. The UE 902 may receive the RRC dedicated message 908 and may store the MCCH PDSCH configurations from the RRC dedicated message.

The UE 902 may be transitioned to an inactive state after the RRC dedicated message 908, as indicated by 910. Messages transmitted by the base station 904 for MBS multicast configuration while the UE 902 is in the inactive state may depend on the option implemented. For options 2 and 3, the base station 904 may transmit a message 912 and an MCCH message 914 while the UE 902 is in the inactive state. For option 1, the base station 904 may transmit an MCCH message 914 and the message 912 may be omitted.

For option 2, the message 912 may be broadcast by the base station 904. The message 912 for option 2 may include a second part of the MCCH configuration to complement the first part of the MCCH configuration transmitted in the RRC dedicated message 908. For option 2, the UE 902 may utilize the first part of the MCCH configuration from the RRC dedicated message 908 and the second part of the MCCH configuration from the message 912 to configure the UE for receiving MCCH transmissions from the base station 904.

For option 3, the message 912 may comprise a scheduling DCI message for the MCCH. The message 912 for option 3 may include an MCCH configuration index indicating an MCCH configuration for the UE 902. For option 3, the UE 902 may identify a stored MCCH configuration corresponding to the indicated MCCH configuration index and configure the UE 902 with the identified MCCH configuration.

In the illustrated embodiment, the message 912 indicates an MCCH configuration index of PDSCH index #3. The UE 902 may determine that the MCCH configuration index corresponds to stored MCCH PDSCH configuration #3. The UE 902 may be configured with MCCH PDSCH configuration #3 based on the MCCH configuration index.

Once configured for receiving messages via MCCH from the base station 904, the UE 902 may monitor MCCH transmissions from the base station 904 for a multicast PTM configuration for the UE 902. The base station 904 may transmit an MCCH message 914 that indicates a multicast PTM configuration for the UE 902. The MCCH message 914 may be transmitted according to the MCCH configuration for the UE 902. The UE 902 may identify the multicast PTM configuration indicated by the MCCH message 914 and may be configured with the multicast PTM configuration.

Access to the RRC dedicated message 908 may be limited to the UE 802 and other UEs may be unable to access the RRC dedicated message 908. As the RRC dedicated message 908 includes the MCCH configuration, the first part of the MCCH configuration, or the PTM configurations, the other UEs may not be aware of the MCCH configuration, the first part of the MCCH configuration, or the PTM configurations that can be implemented for receiving multicast transmissions from the base station. Accordingly, protection is protected from bad actors due to the other UEs being unaware of the MCCH configuration, the first part of the MCCH configuration, or the PTM configurations.

The fourth approach may involve applying a security scheme on a multicast configuration transmitted via the MCCH. For example, one of the following security schemes may be applied on the multicast PTM configuration transmitted via the MCCH channel.

Figure 10:
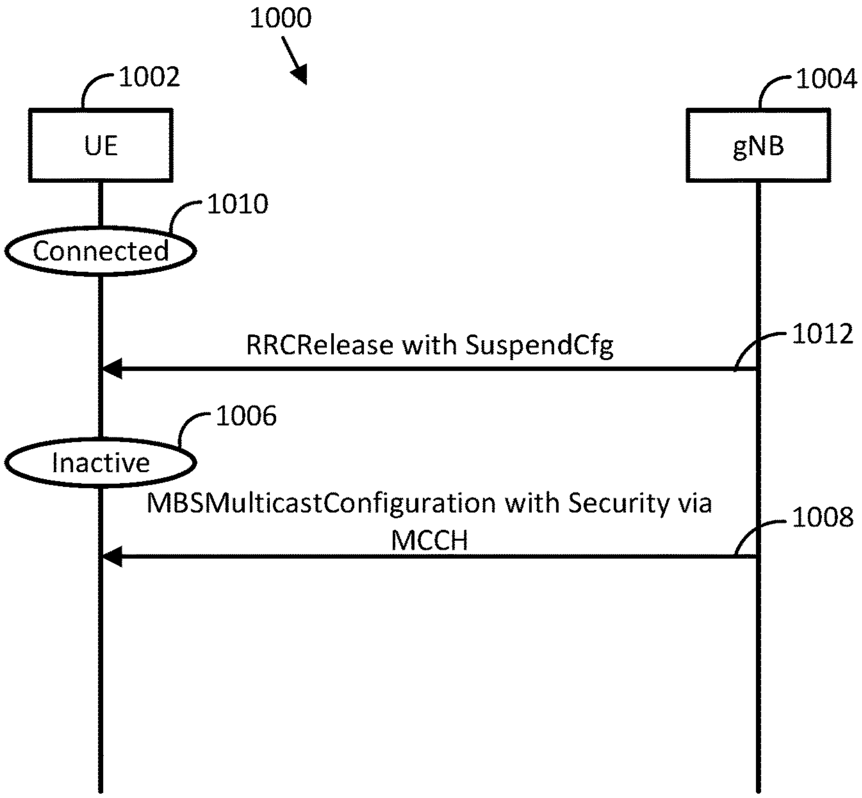
FIG. 10 illustrates an example signaling chart showing multicast configuration via the fourth approach in accordance with some embodiments.

FIG. 10 illustrates an example signaling chart 1000 showing multicast configuration via the fourth approach in accordance with some embodiments. For example, the signaling chart 1000 illustrates signals that may be exchanged for the security scheme approach.

The signaling chart 1000 may include a UE 1002 and a base station 1004. The UE 1002 may include one or more of the features of the first UE 304 (FIG. 3), the second UE 306 (FIG. 3), the third UE 308 (FIG. 3), the UE 702 (FIG. 7), the UE 802 (FIG. 8), the UE 902 (FIG. 9), and/or the UE 1700 (FIG. 17). The base station 1004 may include one or more of the features of the base station 302 (FIG. 3), the base station 704 (FIG. 7), the base station 804 (FIG. 8), the base station 904 (FIG. 9), and/or the gNB 1800 (FIG. 18). The signaling chart 1000 illustrates example messages that may be exchanged between the UE 1002 and the base station 1004 to configure the UE 1002 for MBS multicast transmissions from the base station 1004.

The UE 1002 may be in a connected state, as indicated by 1010. The base station 1004 may transmit an RRC dedicated message 1012 to the UE 1002 while the UE 1002 is in the connected state. The RRC dedicated message 1012 may include data related to a security scheme applied to an MBS multicast configuration provided by the base station 1004 to the UE 1002. The data included in the RRC dedicated message 1012 may depend on the implemented option for the security scheme described below.

The UE 1002 may be in an inactive state, as indicated by 1006. The UE 1002 may be configured to receive MCCH transmissions from the base station 1004. The base station 1004 may transmit an MCCH message 1008, via an MCCH of the base station 1004, to the UE 1002. The MCCH message 1008 may indicate an MBS multicast configuration for the UE 1002. One of the security schemes described in the options below may be applied to the MCCH message 1008, thereby protecting the MCCH message 1008.

In option 1, a Hash ID may be added to protect the MBS multicast configuration. For example, a hash ID may be added to the MBS multicast configuration included in the MCCH message 1008. The NW can generate the Hash ID based on the configuration message and a specific value. For example, the NW may generate the hash ID based on the MCCH message 1008 and the specific value. For option 1, the RRC dedicated message 1012 may indicate the specific value to be utilized by the UE 1002 to process the MBS multicast configuration for configuring the UE 1002 with the MBS multicast configuration.

In option 2, a signature may be added to protect the MBS multicast configuration. For example, a signature may be added to the MBS multicast configuration included in the MCCH message 1008. The parameter/configuration to generate the signature can be per MBS session/MRB or per MCCH message. For example, the network may define which parameter and/or configuration is to be utilized to generate a signature for each MBS session/MRB or MCCH message. The signatures generated may be generated on a per MBS session/MRB or per MCCH message basis. For option 2, the RRC dedicated message 1012 may indicate the parameter, configuration, and/or signature to be utilized by the UE 1002 to process the MBS multicast configuration for configuring the UE 1002 with the MBS multicast configuration. The RRC dedicated message 1012 may indicate the MBS session/MRB or MCCH message corresponding to the parameter, configuration, and/or signature provided in the RRC dedicated message 1012.

In option 3, the multicast configuration may be ciphered and integrity protected on a per MBS session basis. The NW can use the multicast session ID to cipher or integrity protect the RRC message, and the UE can decipher or verify the integrity protection (IP) according to the multicast session ID or the session specific security key. For the session/MRB specific key, the NW can provide the key together with the MRB configuration or when the UE is released to INACTIVE state via UE specific RRC signaling. For example, the NW may cipher or integrity protect the MBS multicast configuration. In embodiments where the UE 1002 utilizes a session specific security key to decipher or verify the IP, the RRC dedicated message 1012 may include the security key. The MBS multicast configuration included in the MCCH message 1008 may be ciphered and/or integrity protected. The UE 1002 may utilize the multicast session ID and/or the security key to decipher the MBS multicast configuration and/or verify the IP for the MBS multicast configuration.

In option 4, the multicast configuration may be ciphered and integrity protected by a specific security key. The difference compared to option 3 is that the multicast configuration can include more than one multicast session. The specific security key is configured to UE via the dedicated RRC signaling, which is common for all the multicast sessions in the same cell or a certain area. For example, the NW may cipher or integrity protect the MBS multicast configuration. The RRC dedicated message 1012 may include the security key. The MBS multicast configuration included in the MCCH message 1008 may be ciphered and/or integrity protected. The UE 1002 may utilize the security key to decipher the MBS multicast configuration and/or verify the IP for the MBS multicast configuration.

The security scheme being applied to the MBS multicast configuration may protect UEs other than the UE 1002 from accessing the MBS multicast configuration. Accordingly, the security scheme may provide protection from bad actors.

Figure 11:
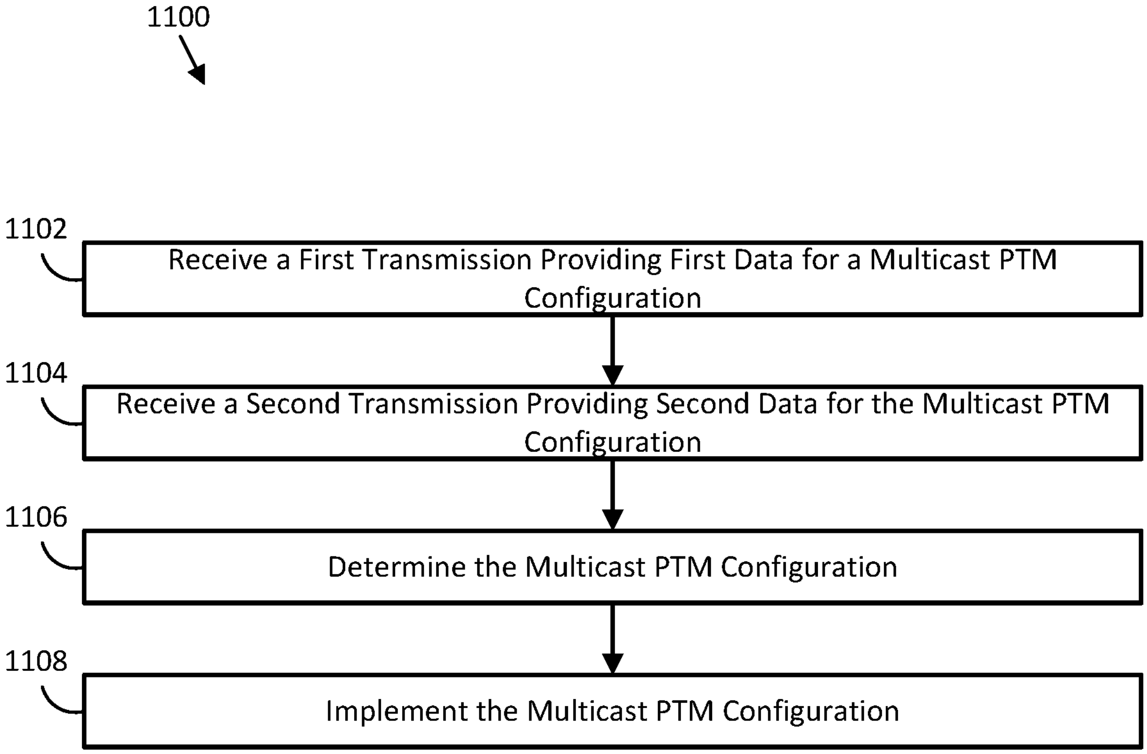
FIG. 11 illustrates an example procedure of operating a user equipment (UE) in accordance with some embodiments.

FIG. 11 illustrates an example procedure 1100 of operating a UE in accordance with some embodiments. For example, the procedure 1100 may be executed by a UE, such as the first UE 304 (FIG. 3), the second UE 306 (FIG. 3), the third UE 308 (FIG. 3), the UE 702 (FIG. 7), the UE 802 (FIG. 8), the UE 902 (FIG. 9), the UE 1002 (FIG. 10), and/or the UE 1700 (FIG. 17).

The procedure 1100 may include receiving a first transmission providing first data for a multicast PTM configuration in 1102. In particular, the UE may receive, via RRC dedicated signaling, a first transmission providing first data for a multicast PTM configuration for an inactive state of the UE. In some embodiments, the first transmission may include one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

The first data may comprise a multicast session/MRB configuration in some embodiments. In some of these embodiments, the first data may further comprise a MAC related scheduling/DRX configuration. In some embodiments, the first data may comprise one or more multicast PTM configurations.

The procedure 1100 may include receiving a second transmission providing second data for the multicast PTM configuration in 1104. In particular, the UE may receive, via an MCCH, a second transmission providing second data for the multicast PTM configuration for the active state. In some embodiments, the second transmission may include one or more of the features of the MCCH message 712 (FIG. 7), the MCCH message 812 (FIG. 8), the MCCH message 914 (FIG. 9), and/or the MCCH message 1008 (FIG. 10).

In some embodiments, the second data may comprise a PTM PDCCH/PDSCH configuration in CFR. Further, the second data may comprise a MAC related scheduling/DRX configuration in some embodiments. In some embodiments, the second data may comprise a configuration index. The configuration index may indicate the multicast PTM configuration to be implemented from one or more multicast PTM configurations provided by the first data.

The procedure 1100 may include determining the multicast PTM configuration in 1106. In particular, the UE may determine the multicast PTM configuration for the inactive state based on the first data and the second data.

The procedure 1100 may include implementing the multicast PTM configuration in 1108. In particular, the UE may implement the multicast PTM configuration for the inactive state.

In some embodiments, the procedure 1100 may further include receiving reconfiguration information related to a MAC related scheduling/DRX configuration. In particular, the UE may receive, via RRC dedicated signaling, reconfiguration information related to a MAC related scheduling/DRX configuration. In some embodiments, the reconfiguration information may comprise DRX offset information. The UE may reconfigure the multicast PTM configuration based on the reconfiguration information.

In some embodiments, the procedure 1100 may further include receiving reconfiguration information related to a MAC related scheduling/DRX configuration. In particular, the UE may receive, via the MCCH, reconfiguration information related to a MAC related scheduling/DRX configuration. The UE may reconfigure the multicast PTM configuration based on the reconfiguration information.

In some embodiments, the procedure 1100 may further include receiving an indication of a first portion of MAC related scheduling/DRX reconfiguration information to be received via RRC dedicated signaling and a second portion of the MAC related scheduling/DRX reconfiguration information to be received via the MCCH. In particular, the UE may receive, via RRC dedicated signaling, an indication of the first portion of the MAC related scheduling/DRX reconfiguration information to be received via RRC dedicated signaling and a second portion of the MAC related scheduling/DRX reconfiguration information to be received via the MCCH.

In some embodiments, the procedure 1100 may further include determining that the configuration index does not correspond to any of the one or more PTM configurations. In particular, the UE may determine that the configuration index from the second data does not correspond to any of the one or more multicast PTM configurations from the first data. The UE may initiate an RRC resume procedure to transition to a connected state. The UE may provide, while in the connected mode, an indication that the configuration index does not correspond to any of the one or more multicast PTM configurations. The UE may further receive an indication of the multicast PTM configuration to be implemented based on providing the indication that the configuration index does not correspond to any of the one or more multicast PTM configurations.

While FIG. 11 may imply an order of the operation of the procedure 1100, it should be understood that the operations may be performed in a different order and/or one or more of the operations may be performed concurrently in other embodiments. Additionally, it should be understood that one or more additional operations may be included in the procedure 1100 and/or one or more of the operations may be omitted in other embodiments.

Figure 12:
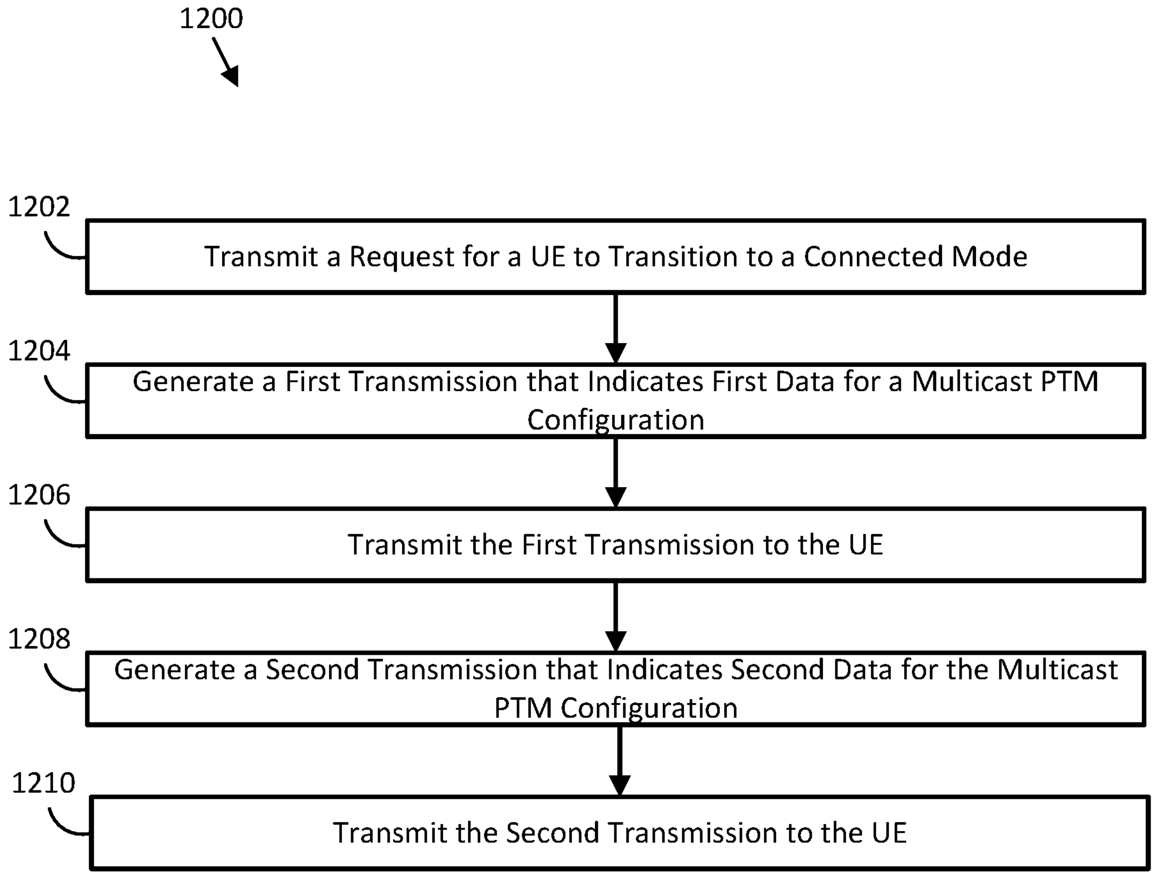
FIG. 12 illustrates an example procedure of operating a base station in accordance with some embodiments.

FIG. 12 illustrates an example procedure 1200 of operating a base station in accordance with some embodiments. For example, the procedure 1100 may be executed by a base station, such as the base station 302 (FIG. 3), the base station 704 (FIG. 7), the base station 804 (FIG. 8), the base station 904 (FIG. 9), the base station 1004 (FIG. 10), and/or the gNB 1800 (FIG. 18).

The procedure 1200 may include transmitting a request for a UE to transition to a connected mode in 1202. In particular, the base station may transmit, to a UE, a request for the UE to transition to a connected mode.

The procedure 1200 may include generating a first transmission that indicates first data for a multicast PTM configuration in 1204. In particular, the base station may generate a first transmission that indicates first data for a multicast PTM configuration for an inactive state of the UE. The first transmission may include one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

In some embodiments, the first data may comprise a multicast session/MRB configuration. In some of these embodiments, the first data may further comprise a MAC related scheduling/DRX configuration. Further, the first data may comprise one or more multicast PTM configurations in some embodiments.

The procedure 1200 may include transmitting the first transmission to the UE in 1206. In particular, the base station may transmit, via RRC dedicated signaling while the UE is in the connected mode, the first transmission to the UE.

The procedure 1200 may include generating a second transmission that indicates second data for the multicast PTM configuration in 1208. In particular, the base station may generate a second transmission that indicates second data for the multicast PTM configuration. The second transmission may include one or more of the features of the MCCH message 712 (FIG. 7), the MCCH message 812 (FIG. 8, the MCCH message 914 (FIG. 9), and/or the MCCH message 1008 (FIG. 10).

In some embodiments, the second data may comprise a PTM PDCCH/PDSCH configuration in CFR. The second data may comprise a MAC related scheduling/DRX configuration in some embodiments. Further, the second data may comprise a configuration index in some embodiments. The configuration index may indicate the multicast PTM configuration to be implemented from the one or more multicast PTM configurations provided by the first data.

The procedure 1200 may include transmitting the second transmission to the UE in 1210. In particular, the base station may transmit, via an MCCH, the second transmission to the UE. The first data and the second data may be utilized to configure the UE with the multicast PTM configuration.

In some embodiments, the procedure 1200 may further include generating reconfiguration information related to a MAC related scheduling DRX configuration. In particular, the base station may generate reconfiguration information related to a MAC related scheduling/DRX configuration. The base station may transmit, via RRC dedicated signaling, the reconfiguration information related to the MAC related scheduling/DRX configuration. The reconfiguration information may cause the UE to reconfigure the multicast PTM configuration.

In some embodiments, the procedure 1200 may further include generating reconfiguration information related to a MAC related scheduling/DRX configuration. In particular, the base station may generate reconfiguration information related to a MAC related scheduling/DRX configuration. The reconfiguration information may comprise DRX offset information in some embodiments. The base station may transmit, via the MCCH, the reconfiguration information related to the MAC related scheduling/DRX configuration. The reconfiguration information may cause the UE to reconfigure the multicast PTM configuration.

In some embodiments, the procedure 1200 may further include determining a first portion of a MAC related scheduling/DRX reconfiguration to be transmitted via RRC dedicated signaling and a second portion of the MAC related scheduling/DRX reconfiguration to be transmitted via the MCCH. In particular, the base station may determine a first portion of a MAC related scheduling/DRX reconfiguration to be transmitted via RRC dedicated signaling and a second portion of the MAC related scheduling/DRX reconfiguration to be transmitted via the MCCH. The base station may generate a third transmission that indicates the first portion of the MAC related scheduling/DRX reconfiguration information to be transmitted via RRC dedicated signaling and the second portion of the MAC related scheduling/DRX reconfiguration information to be transmitted via the MCCH. The base station may transmit, via RRC dedicated signaling to the UE, the third transmission.

While FIG. 12 may imply an order of the operation of the procedure 1200, it should be understood that the operations may be performed in a different order and/or one or more of the operations may be performed concurrently in other embodiments. Additionally, it should be understood that one or more additional operations may be included in the procedure 1200 and/or one or more of the operations may be omitted in other embodiments.

Figure 13:
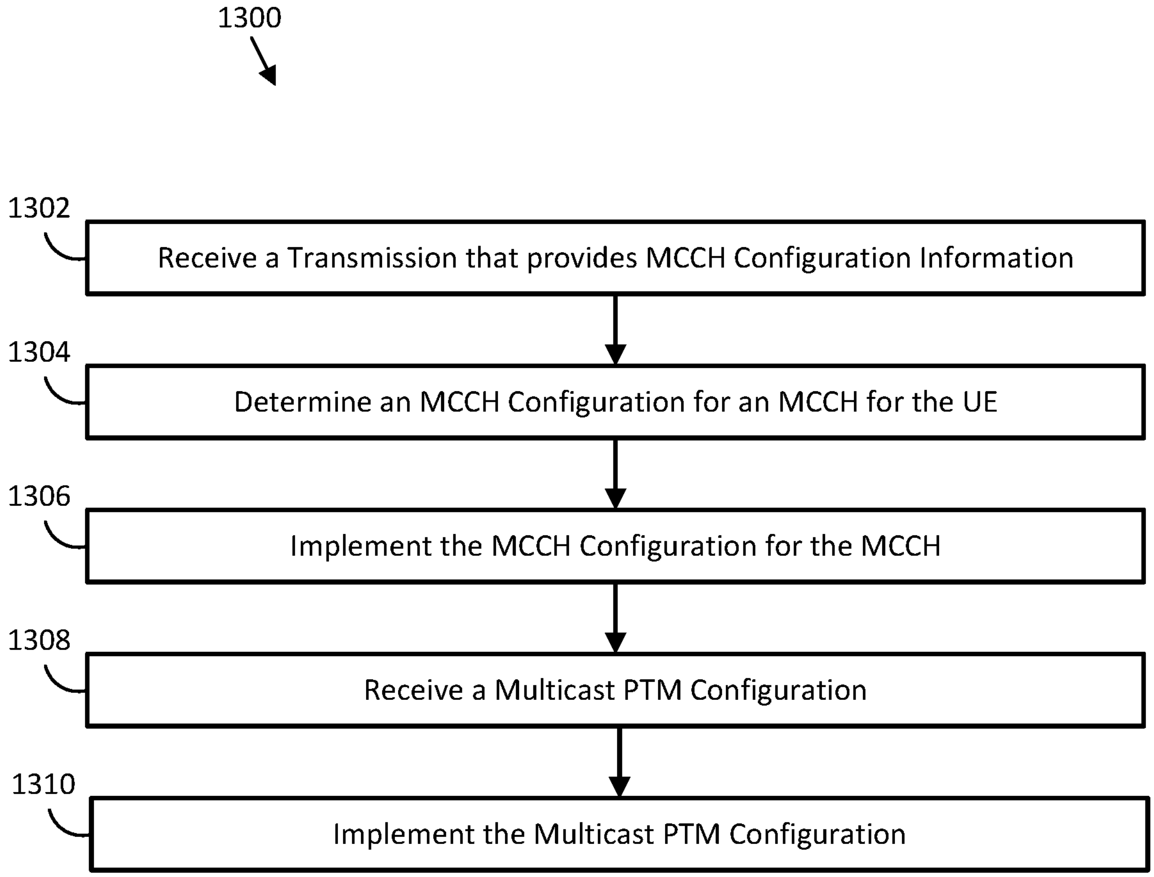
FIG. 13 illustrates an example procedure of operating a UE in accordance with some embodiments.

FIG. 13 illustrates an example procedure 1300 of operating a UE in accordance with some embodiments. For example, the procedure 1300 may be executed by a UE, such as the first UE 304 (FIG. 3), the second UE 306 (FIG. 3), the third UE 308 (FIG. 3), the UE 702 (FIG. 7), the UE 802 (FIG. 8), the UE 902 (FIG. 9), the UE 1002 (FIG. 10), and/or the UE 1700 (FIG. 17).

The procedure 1300 may include receiving a transmission that provides MCCH configuration information in 1302. In particular, the UE may receive, via UE dedicated signaling, a transmission that provides MCCH configuration information. The transmission may include one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

In some embodiments, the MCCH configuration may comprise an indication of an MCCH configuration. The transmission may comprise a first transmission in some embodiments. Further, the MCCH configuration information may comprise first MCCH configuration information in some embodiments. The first MCCH configuration information may comprise a first portion of an MCCH configuration in some of these embodiments. Further, the first MCCH configuration information may comprise one or more MCCH configurations in some embodiments.

The procedure 1300 may include determining an MCCH configuration for an MCCH for the UE in 1304. In particular, the UE may determine an MCCH configuration for an MCCH for the UE based on the MCCH configuration information. In some embodiments, determining the MCCH configuration may comprise identifying the indication of the MCCH configuration in the MCCH configuration information.

The procedure 1300 may include implementing the MCCH configuration for the MCCH in 1306. In particular, the UE may implement the MCCH configuration for the MCCH.

The procedure 1300 may include receiving a multicast PTM configuration in 1308. In particular, the UE may receive, via the MCCH configured with the MCCH configuration, a multicast PTM configuration for an inactive state of the UE.

The procedure 1300 may include implementing the multicast PTM configuration in 1310. In particular, the UE may implement the multicast PTM configuration for the inactive state.

In some embodiments, the procedure 1300 may further include receiving a second transmission that provides second MCCH configuration information. In particular, the UE may receive, via broadcast signaling, a second transmission that provides second MCCH configuration information. The second transmission may include one or more of the features of the MCCH message 712 (FIG. 7), the MCCH message 812 (FIG. 8), the MCCH message 914 (FIG. 9), and/or the MCCH message 1008 (FIG. 10). The second MCCH configuration information may comprise a second portion of the MCCH configuration. Further, the MCCH configuration may be determined further based on the second MCCH configuration information.

In some embodiments, the procedure 1300 may include receiving a second transmission that provides an MCCH configuration index. In particular, the UE may receive, via scheduling DCI, a second transmission that provides an MCCH configuration index. The second transmission may include one or more of the features of the message 912 (FIG. 9). In some embodiments, the MCCH configuration index may be for PDSCH reception. In some embodiments, determining the MCCH configuration may comprise determining the MCCH configuration from the one or more MCCH configurations based on the MCCH configuration index.

While FIG. 13 may imply an order of the operation of the procedure 1300, it should be understood that the operations may be performed in a different order and/or one or more of the operations may be performed concurrently in other embodiments. Additionally, it should be understood that one or more additional operations may be included in the procedure 1300 and/or one or more of the operations may be omitted in other embodiments.

Figure 14:
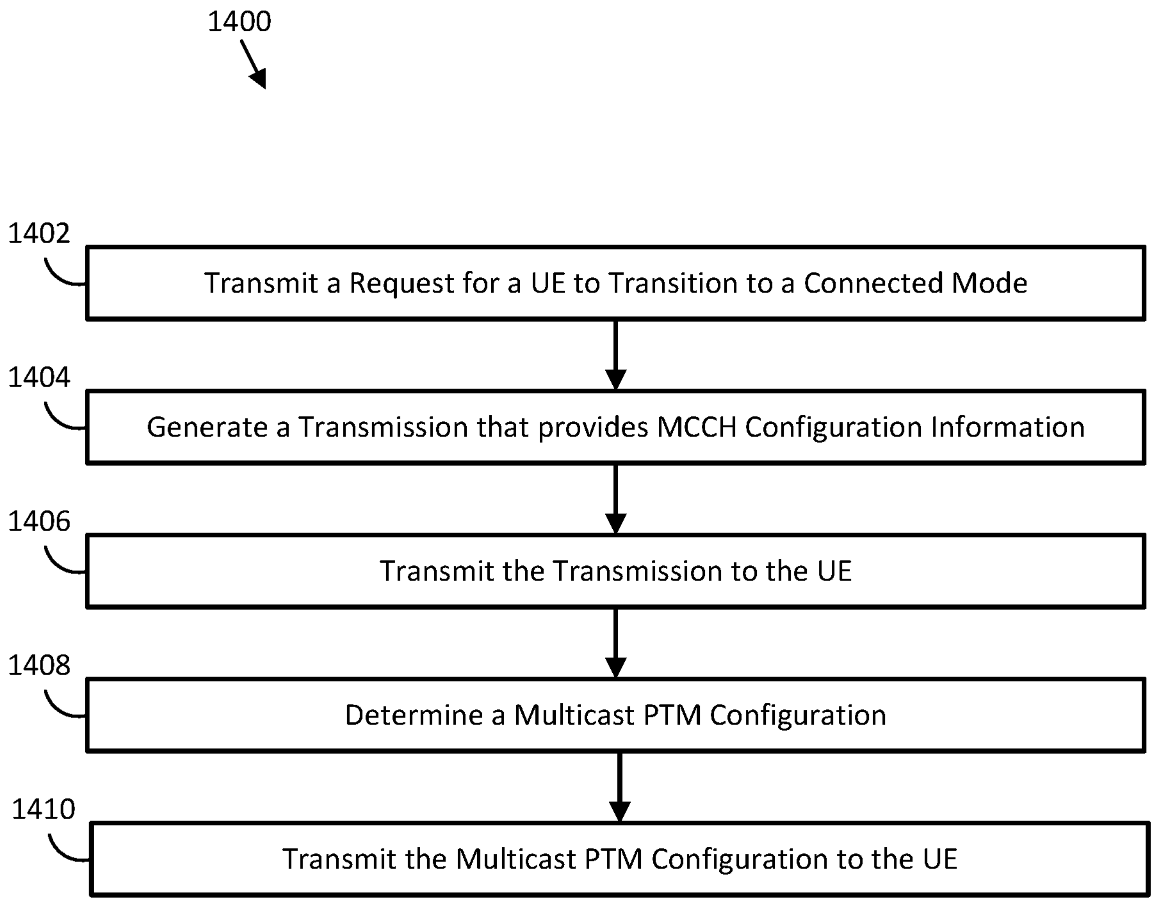
FIG. 14 illustrates an example procedure of operating a base station in accordance with some embodiments.

FIG. 14 illustrates an example procedure 1400 of operating a base station in accordance with some embodiments. For example, the procedure 1400 may be executed by a base station, such as the base station 302 (FIG. 3), the base station 704 (FIG. 7), the base station 804 (FIG. 8), the base station 904 (FIG. 9), the base station 1004 (FIG. 10), and/or the gNB 1800 (FIG. 18).

The procedure 1400 may include transmitting a request for a UE to transition to a connected mode in 1402. In particular, the base station may transmit, to a UE, a request for the UE to transition to a connected mode.

The procedure 1400 may include generating a transmission that provides MCCH configuration information in 1404. In particular, the base station may generate a transmission that provides MCCH configuration information. The transmission may include one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

In some embodiments, the MCCH configuration information may comprise an indication of an MCCH configuration for an MCCH. The transmission may comprise a first transmission in some embodiments. Further, the MCCH configuration information may comprise first MCCH configuration information in some embodiments. In some embodiments, the first MCCH configuration information may comprise a first portion of an MCCH configuration. The first MCCH configuration information may comprise one or more MCCH configurations in some embodiments.

The procedure 1400 may include transmitting the transmission to the UE in 1406. In particular, the base station may transmit, via UE dedicated signaling, the transmission to the UE for configuration of an MCCH for the UE with an MCCH configuration related to the MCCH configuration information. The transmission may include one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

The procedure 1400 may include determining a multicast PTM configuration in 1408. In particular, the base station may determine a multicast PTM configuration for an inactive state of the UE.

The procedure 1400 may include transmitting the multicast PTM configuration to the UE in 1410. In particular, the base station may transmit, via the MCCH, the multicast PTM configuration to the UE for configuring the UE with the multicast PTM configuration. The multicast PTM configuration may be transmitted in a transmission that includes one or more of the features of the MCCH message 712 (FIG. 7), the MCCH message 812 (FIG. 8), the MCCH message 914 (FIG. 9) and/or the MCCH message 1008 (FIG. 10).

In some embodiments, the procedure 1400 may further include generating a second transmission that provides second MCCH configuration information. In particular, the base station may generate a second transmission that provides second MCCH configuration information. The second transmission may include one or more of the features of the message 912 (FIG. 9). The second MCCH configuration information may comprise a second portion of the MCCH configuration. The base station may transmit the second transmission to the UE for configuration of the MCCH.

In some embodiments, the procedure 1400 may further include generating a second transmission that provides an MCCH configuration index. In particular, the base station may generate a second transmission that provides an MCCH configuration index. The second transmission may include one or more of the features of the message 912 (FIG. 9). The MCCH configuration index indicates the MCCH configuration from the one or more MCCH configurations from the first MCCH configuration information. In some embodiments, the MCCH configuration index may be for PDSCH reception. The base station may transmit, via scheduling DCI, the second transmission to the UE.

While FIG. 14 may imply an order of the operation of the procedure 1400, it should be understood that the operations may be performed in a different order and/or one or more of the operations may be performed concurrently in other embodiments. Additionally, it should be understood that one or more additional operations may be included in the procedure 1400 and/or one or more of the operations may be omitted in other embodiments.

Figure 15:
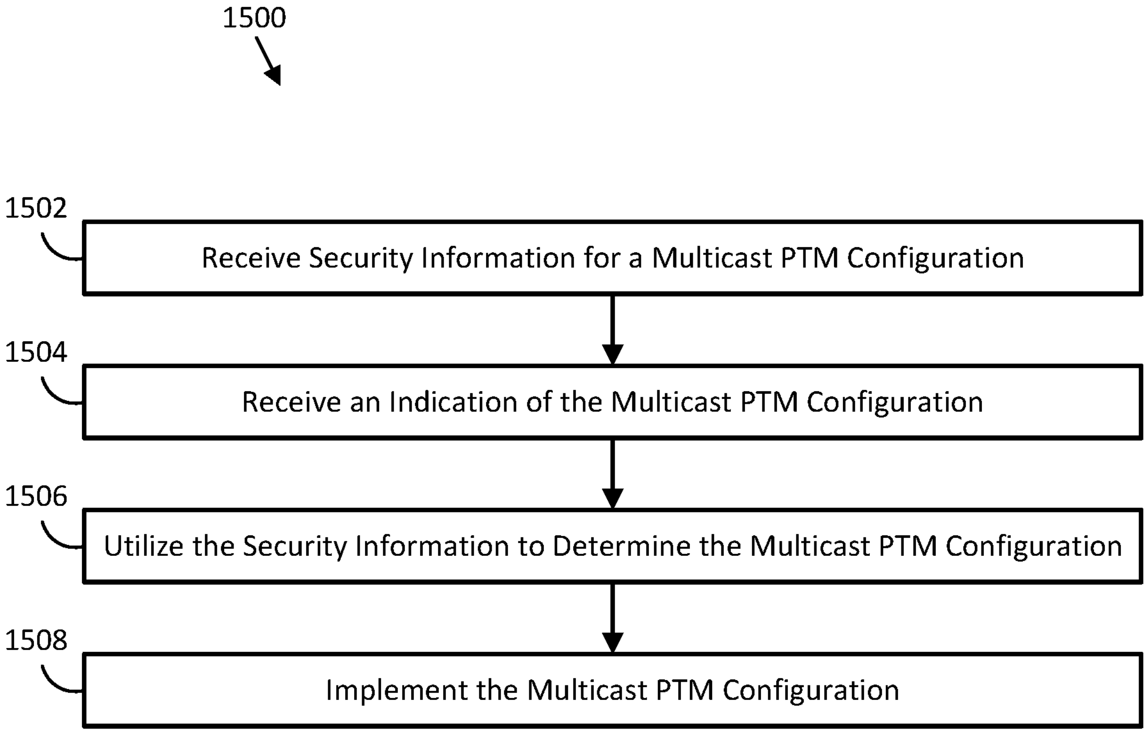
FIG. 15 illustrates an example procedure of operating a UE in accordance with some embodiments.

FIG. 15 illustrates an example procedure 1500 of operating a UE in accordance with some embodiments. For example, the procedure 1500 may be executed by a UE, such as the first UE 304 (FIG. 3), the second UE 306 (FIG. 3), the third UE 308 (FIG. 3), the UE 702 (FIG. 7), the UE 802 (FIG. 8), the UE 902 (FIG. 9), the UE 1002 (FIG. 10), and/or the UE 1700 (FIG. 17).

The procedure 1500 may include receiving security information for a multicast PTM configuration in 1502. In particular, the UE may receive, via RRC dedicated signaling, security information for a multicast PTM configuration for an inactive state of the UE. The security information may be received in a transmission that includes one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10.

In some embodiments, the security information may comprise a value related to a hash. Further, the secure information may comprise information related to a signature in some embodiments. In some embodiments, the security information may comprise a security key. The security key may be specific to an MBS session in some of these embodiments. In some of these embodiments, the security key may be for multiple MBS sessions.

The procedure 1500 may include receiving an indication of the multicast PTM configuration in 1504. In particular, the UE may receive, via an MCCH, an indication of the multicast PTM configuration with security protection. The indication of the multicast PTM configuration may be received in a transmission that includes one or more of the features of the MCCH message 712 (FIG. 7), the MCCH message 812 (FIG. 8), the MCCH message 914 (FIG. 9), and/or the MCCH message 1008 (FIG. 10).

In some embodiments, the indication of the multicast PTM configuration with security protection may comprise a hashed indication of the multicast PTM configuration produced via the hash. Further, the indication of the multicast PTM configuration with security protection may comprise a signed indication of the multicast PTM configuration signed via the signature in some embodiments. In some embodiments, the indication of the multicast PTM configuration with security protection may comprise a ciphered or integrity protected indication of the multicast PTM configuration.

The procedure 1500 may include utilizing the security information to determine the multicast PTM configuration in 1506. In particular, the UE may utilize the security information to determine the multicast PTM configuration through the security protection.

In some embodiments, utilizing the security information to determine the multicast PTM configuration may comprise utilizing the value to determine the multicast PTM configuration from the hashed indication of the multicast PTM configuration. Utilizing the security information to determine the multicast PTM configuration may comprise utilizing the information related to the signature to determine the multicast PTM configuration from the signed indication of the multicast PTM configuration in some embodiments. Further, utilizing the security information to determine the multicast PTM configuration may comprise utilizing the security key to determine the multicast PTM configuration from the ciphered or integrity protected indication of the multicast PTM configuration in some embodiments.

The procedure 1500 may include implementing the multicast PTM configuration in 1508. In particular, the UE may implement the multicast PTM configuration for the inactive state.

While FIG. 15 may imply an order of the operation of the procedure 1500, it should be understood that the operations may be performed in a different order and/or one or more of the operations may be performed concurrently in other embodiments. Additionally, it should be understood that one or more additional operations may be included in the procedure 1500 and/or one or more of the operations may be omitted in other embodiments.

Figure 16:
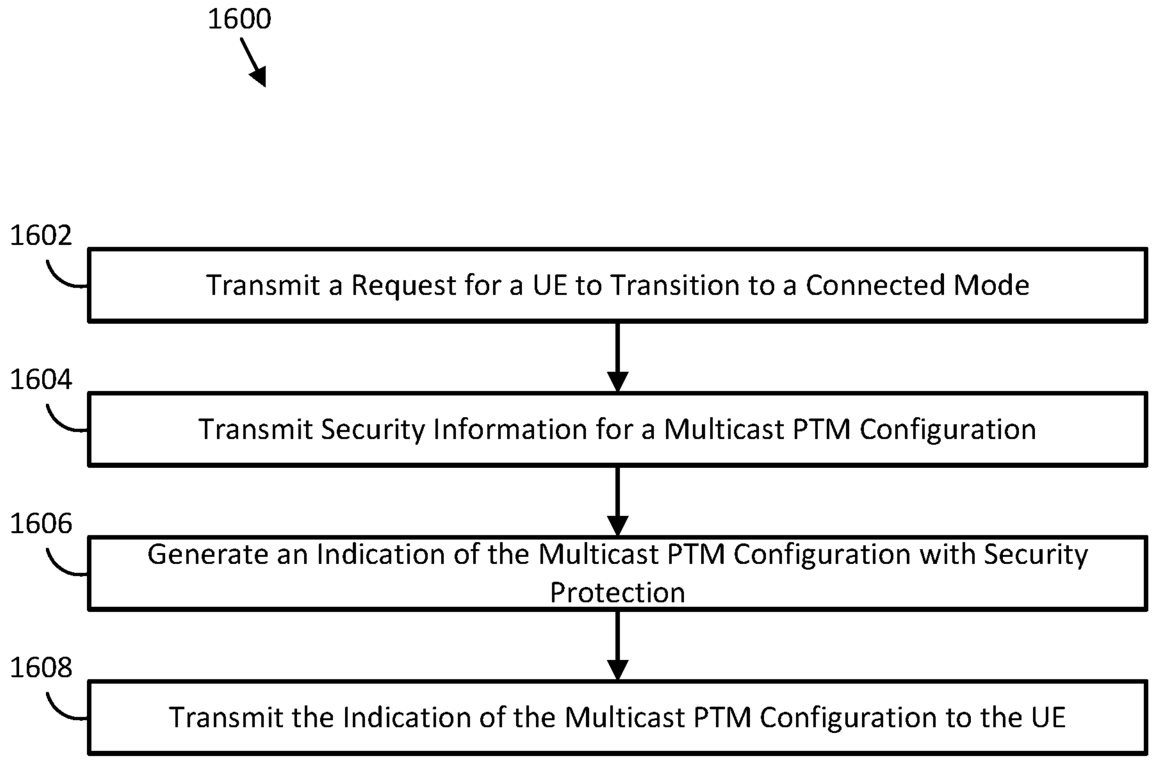
FIG. 16 illustrates an example procedure of operating a base station in accordance with some embodiments.

FIG. 16 illustrates an example procedure 1600 of operating a base station in accordance with some embodiments. For example, the procedure 1100 may be executed by a base station, such as the base station 302 (FIG. 3), the base station 704 (FIG. 7), the base station 804 (FIG. 8), the base station 904 (FIG. 9), the base station 1004 (FIG. 10), and/or the gNB 1800 (FIG. 18).

The procedure 1600 may include transmitting a request for a UE to transition to a connected mode in 1602. In particular, the base station may transmit, to a UE, a request for the UE to transition to a connected mode.

The procedure 1600 may include transmitting security information for a multicast PTM configuration in 1604. In particular, the base station may transmit, via RRC dedicated signaling to the UE while the UE is in the connected mode, security information for a multicast PTM configuration for an inactive state of the UE. The security information may be transmitted in a transmission that includes one or more of the features of the RRC dedicated message 706 (FIG. 7), the RRC dedicated message 808 (FIG. 8), the RRC dedicated message 908 (FIG. 9), and/or the RRC dedicated message 1012 (FIG. 10).

In some embodiments, the security information may comprise a value related to a hash. The security information may comprise information related to a signature in some embodiments. Further, the security information may comprise a security key in some embodiments. In some of these embodiments, the security key may be specific to an MBS session. In some of these embodiments, the security key may be for multiple MBS sessions.

The procedure 1600 may include generating an indication of the multicast PTM configuration with security protection in 1606. In particular, the base station may generate an indication of the multicast PTM configuration with security protection related to the security information applied to the indication. The indicate of the multicast PTM configuration may be transmitted in a transmission that includes one or more of the features of the MCCH message 712 (FIG. 7), the MCCH message 812 (FIG. 8), the MCCH message 914 (FIG. 9), and/or the MCCH message 1008 (FIG. 10).

In some embodiments, the indication of the multicast PTM configuration with security protection may comprise a hashed indication of the multicast PTM configuration produced via the hash. The indication of the multicast PTM configuration with security protection may comprise a signed indication of the multicast PTM configuration signed via the signature in some embodiments. Further, the indication of the multicast PTM configuration with security protection may comprise a ciphered or integrity protected indication of the multicast PTM configuration.

The procedure 1600 may include transmitting the indication of the multicast PTM configuration to the UE in 1608. In particular, the base station may transmit the indication of the multicast PTM configuration to the UE. The UE may utilize the security information to determine the multicast PTM configuration through the security protection.

While FIG. 16 may imply an order of the operation of the procedure 1600, it should be understood that the operations may be performed in a different order and/or one or more of the operations may be performed concurrently in other embodiments. Additionally, it should be understood that one or more additional operations may be included in the procedure 1600 and/or one or more of the operations may be omitted in other embodiments.

FIG. 17 illustrates an example UE 1700 in accordance with some embodiments. The UE 1700 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 1700 may be a RedCap UE or NR-Light UE.

The UE 1700 may include processors 1704, RF interface circuitry 1708, memory/storage 1712, user interface 1716, sensors 1720, driver circuitry 1722, power management integrated circuit (PMIC) 1724, antenna structure 1726, and battery 1728. The components of the UE 1700 may be implemented as integrated circuits (ICs), portions thereof, discrete electronic devices, or other modules, logic, hardware, software, firmware, or a combination thereof. The block diagram of FIG. 17 is intended to show a high-level view of some of the components of the UE 1700. However, some of the components shown may be omitted, additional components may be present, and different arrangement of the components shown may occur in other implementations.

The components of the UE 1700 may be coupled with various other components over one or more interconnects 1732, which may represent any type of interface, input/output, bus (local, system, or expansion), transmission line, trace, optical connection, etc. that allows various circuit components (on common or different chips or chipsets) to interact with one another.

The processors 1704 may include processor circuitry such as, for example, baseband processor circuitry (BB) 1704A, central processor unit circuitry (CPU) 1704B, and graphics processor unit circuitry (GPU) 1704C. The processors 1704 may include any type of circuitry or processor circuitry that executes or otherwise operates computer-executable instructions, such as program code, software modules, or functional processes from memory/storage 1712 to cause the UE 1700 to perform operations as described herein. For example, the processors 1704 may include interface circuitry coupled with the BB 1704A, the CPU 1704B, and/or the GPU 1704C that can communicatively couple the BB 1704A, the CPU 1704B, and/or the GPU 1704C to the memory/storage 1712 for retrieval of the computer-executable instructions (among other operations) from the memory/storage 1712 for execution.

In some embodiments, the baseband processor circuitry 1704A may access a communication protocol stack 1136 in the memory/storage 1712 to communicate over a 3GPP compatible network. In general, the baseband processor circuitry 1704A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1708.

The baseband processor circuitry 1704A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1712 may include one or more non-transitory, computer-readable media that includes instructions (for example, communication protocol stack 1136) that may be executed by one or more of the processors 1704 to cause the UE 1700 to perform various operations described herein. The memory/storage 1712 include any type of volatile or non-volatile memory that may be distributed throughout the UE 1700. In some embodiments, some of the memory/storage 1712 may be located on the processors 1704 themselves (for example, L1 and L2 cache), while other memory/storage 1712 is external to the processors 1704 but accessible thereto via a memory interface. The memory/storage 1712 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1708 may include transceiver circuitry and radio frequency front module (RFEM) that allows the UE 1700 to communicate with other devices over a radio access network. The RF interface circuitry 1708 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1726 and proceed to filter and amplify (with a low-noise amplifier) the signal. The signal may be provided to a receiver of the transceiver that down-converts the RF signal into a baseband signal that is provided to the baseband processor of the processors 1704.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1726.

In various embodiments, the RF interface circuitry 1708 may be configured to transmit/receive signals in a manner compatible with NR access technologies.

The antenna 1726 may include antenna elements to convert electrical signals into radio waves to travel through the air and to convert received radio waves into electrical signals. The antenna elements may be arranged into one or more antenna panels. The antenna 1726 may have antenna panels that are omnidirectional, directional, or a combination thereof to enable beamforming and multiple input, multiple output communications. The antenna 1726 may include microstrip antennas, printed antennas fabricated on the surface of one or more printed circuit boards, patch antennas, phased array antennas, etc. The antenna 1726 may have one or more panels designed for specific frequency bands including bands in FR1 or FR2.

The user interface circuitry 1716 includes various input/output (I/O) devices designed to enable user interaction with the UE 1700. The user interface 1716 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1700.

The sensors 1720 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1722 may include software and hardware elements that operate to control particular devices that are embedded in the UE 1700, attached to the UE 1700, or otherwise communicatively coupled with the UE 1700. The driver circuitry 1722 may include individual drivers allowing other components to interact with or control various input/output (I/O) devices that may be present within, or connected to, the UE 1700. For example, driver circuitry 1722 may include a display driver to control and allow access to a display device, a touchscreen driver to control and allow access to a touchscreen interface, sensor drivers to obtain sensor readings of sensor circuitry 1720 and control and allow access to sensor circuitry 1720, drivers to obtain actuator positions of electro-mechanic components or control and allow access to the electro-mechanic components, a camera driver to control and allow access to an embedded image capture device, audio drivers to control and allow access to one or more audio devices.

The PMIC 1724 may manage power provided to various components of the UE 1700. In particular, with respect to the processors 1704, the PMIC 1724 may control power-source selection, voltage scaling, battery charging, or DC-to-DC conversion.

In some embodiments, the PMIC 1724 may control, or otherwise be part of, various power saving mechanisms of the UE 1700. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1700 may power down for brief intervals of time and thus save power. If there is no data traffic activity for an extended period of time, then the UE 1700 may transition off to an RRC_Idle state, where it disconnects from the network and does not perform operations such as channel quality feedback, handover, etc. The UE 1700 goes into a very low power state and it performs paging where again it periodically wakes up to listen to the network and then powers down again. The UE 1700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1728 may power the UE 1700, although in some examples the UE 1700 may be mounted deployed in a fixed location, and may have a power supply coupled to an electrical grid. The battery 1728 may be a lithium ion battery, a metal-air battery, such as a zinc-air battery, an aluminum-air battery, a lithium-air battery, and the like. In some implementations, such as in vehicle-based applications, the battery 1728 may be a typical lead-acid automotive battery.

FIG. 18 illustrates an example gNB 1800 in accordance with some embodiments. The gNB 1800 may include processors 1804, RF interface circuitry 1808, core network (CN) interface circuitry 1812, memory/storage circuitry 1816, and antenna structure 1826.

The components of the gNB 1800 may be coupled with various other components over one or more interconnects 1828.

The processors 1804, RF interface circuitry 1808, memory/storage circuitry 1816 (including communication protocol stack 1810), antenna structure 1826, and interconnects 1828 may be similar to like-named elements shown and described with respect to FIG. 17.

The CN interface circuitry 1812 may provide connectivity to a core network, for example, a 5th Generation Core network (5GC) using a 5GC-compatible network interface protocol such as carrier Ethernet protocols, or some other suitable protocol. Network connectivity may be provided to/from the gNB 1800 via a fiber optic or wireless backhaul. The CN interface circuitry 1812 may include one or more dedicated processors or FPGAs to communicate using one or more of the aforementioned protocols. In some implementations, the CN interface circuitry 1812 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE) comprising receiving, via radio resource control (RRC) dedicated signaling, a first transmission providing first data for a multicast point-to-multipoint (PTM) configuration for an inactive state of the UE, receiving, via a multicast/broadcast services control channel (MCCH), a second transmission providing second data for the multicast PTM configuration for the inactive state, determining the multicast PTM configuration for the inactive state based at least in part on the first data and the second data, and implementing the multicast PTM configuration for the inactive state.

Example 2 may include the method of example 1, wherein the first data comprises a multicast session/multicast radio bearer (MRB) configuration, and the second data comprises a physical layer (PHY) configuration related to multicast PTM transmission in an inactive state.

Example 3 may include the method of example 2, wherein the first data further comprises a medium access control (MAC) configuration related to multicast PTM for an inactive state.

Example 4 may include the method of example 2, wherein the second data further comprises a medium access control (MAC) related scheduling/discontinuous reception (DRX) configuration.

Example 5 may include the method of example 2 further comprising receiving, via RRC dedicated signaling, reconfiguration information related to a medium access control (MAC) related scheduling/discontinuous reception (DRX) configuration, and reconfiguring the multicast PTM configuration based at least in part on the reconfiguration information.

Example 6 may include the method of example 2 further comprising receiving, via the MCCH, reconfiguration information related to a medium access control (MAC) related scheduling/discontinuous reception (DRX) configuration, and reconfiguring the multicast PTM configuration based at least in part on the reconfiguration information.

Example 7 may include the method of example 6, wherein the reconfiguration information causes the MAC DRX configuration of the UE to be reconfigured.

Example 8 may include the method of example 2, further comprising receiving, via RRC dedicated signaling, an indication of a first portion of a medium access control (MAC) related scheduling/discontinuous reception (DRX) reconfiguration information to be received via RRC dedicated signaling and a second portion of the MAC related scheduling/DRX reconfiguration information to be received via the MCCH.

Example 9 may include the method of example 1, wherein the first data comprises one or more multicast PTM configurations, and the second data comprises a configuration index, the configuration index indicating the multicast PTM configuration to be implemented from the one or more multicast PTM configurations.

Example 10 may include the method of example 1, wherein the first data comprises one or more multicast PTM configurations, the second data comprises a configuration index, and the method further comprises determining that the configuration index does not correspond to any of the one or more multicast PTM configurations, initiating an RRC resume procedure to transition to a connected mode, providing, while in the connected mode, an indication that the configuration index does not correspond to any of the one or more multicast PTM configurations, and receiving an indication of the multicast PTM configuration to be implemented based at least in part on providing the indication that the configuration index does not correspond to any of the one or more multicast PTM configurations.

Example 11 may include a method of operating a base station comprising transmitting, to a user equipment (UE), a request for the UE to transition to a connected mode, generating a first transmission that indicates first data for a multicast point-to-multipoint (PTM) configuration for an inactive state of the UE, transmitting, via radio resource control (RRC) dedicated signaling while the UE is in the connected mode, the first transmission to the UE, generating a second transmission that indicates second data for the multicast PTM configuration, and transmitting, via a multicast/broadcast services control channel (MCCH), the second transmission to the UE, the first data and the second data to be utilized to configure the UE with the multicast PTM configuration.

Example 12 may include the method of example 11, wherein the first data comprises a multicast session/multicast radio bearer (MRB) configuration, and the second data comprises a PTM physical downlink control channel (PDCCH)/physical downlink shared channel (PDSCH) configuration in crest factor reduction (CFR).

Example 13 may include the method of example 12, wherein the first data further comprises a medium access control (MAC) related scheduling/discontinuous reception (DRX) configuration.

Example 14 may include the method of example 12, wherein the second data comprises a medium access control (MAC) related scheduling/discontinuous reception (DRX) configuration.

Example 15 may include the method of example 12 further comprising generating reconfiguration information related to a medium access control (MAC) related scheduling/discontinuous reception (DRX) configuration, and transmitting, via RRC dedicated signaling, the reconfiguration information related to the MAC related scheduling/DRX configuration, the reconfiguration information to cause the UE to reconfigure the multicast PTM configuration.

Example 16 may include the method of example 12 further comprising generating reconfiguration information related to a medium access control (MAC) related scheduling/discontinuous reception (DRX) configuration, and transmitting, via the MCCH, the reconfiguration information related to the MAC related scheduling/DRX configuration, the reconfiguration information to cause the UE to reconfigure the multicast PTM configuration.

Example 17 may include the method of example 16, wherein the reconfiguration information comprises DRX offset information.

Example 18 may include the method of example 12 further comprising determining a first portion of a medium access control (MAC) related scheduling/discontinuous reception (DRX) reconfiguration information to be transmitted via RRC dedicated signaling and a second portion of the MAC related scheduling/DRX reconfiguration information to be transmitted via the MCCH, generating a third transmission that indicates the first portion of the MAC related scheduling/DRX reconfiguration information to be transmitted via RRC dedicated signaling and the second portion of the MAC related scheduling/DRX reconfiguration information to be transmitted via the MCCH, and transmitting, via RRC dedicated signaling to the UE, the third transmission.

Example 19 may include the method of example 11, wherein the first data comprises one or more multicast PTM configurations, and the second data comprises a configuration index, the configuration index indicating the multicast PTM configuration to be implemented from the one or more multicast PTM configurations.

Example 20 may include a method of operating a user equipment (UE) comprising determining a multicast/broadcast services control channel (MCCH) configuration for an MCCH for the UE based at least in part on the MCCH configuration information, implementing the MCCH configuration for the MCCH, receiving, via the MCCH configured with the MCCH configuration, a multicast point-to-multipoint (PTM) configuration for an inactive state of the UE, and implementing the multicast PTM configuration for the inactive state.

Example 21 may include the method of example 20, wherein the MCCH configuration information comprises an indication of the MCCH configuration, and determining the MCCH configuration comprises identifying the indication of the MCCH configuration in the MCCH configuration information.

Example 22 may include the method of example 20, wherein the transmission comprises a first transmission, wherein the MCCH configuration information comprises first MCCH configuration information, wherein the first MCCH configuration information comprises a first portion of the MCCH configuration, and wherein the method further comprises receiving, via broadcast signaling, a second transmission that provides second MCCH configuration information, wherein the second MCCH configuration information comprises a second portion of the MCCH configuration, and wherein the MCCH configuration is determined further based at least in part on the second MCCH configuration information.

Example 23 may include the method of example 20, wherein the transmission comprises a first transmission, wherein the MCCH configuration information comprises first MCCH configuration information, wherein the first MCCH configuration information comprises one or more MCCH configurations, and wherein the method further comprises receiving, via scheduling downlink control information (DCI), a second transmission that provides an MCCH configuration index, wherein determining the MCCH configuration comprises determining the MCCH configuration from the one or more MCCH configurations based at least in part on the MCCH configuration index.

Example 24 may include the method of example 23, wherein the MCCH configuration index is for physical downlink shared channel (PDSCH) reception.

Example 25 may include the method of example 20 further comprising receiving, via UE dedicated signaling, a transmission that provides MCCH configuration information.

Example 26 may include a method of operating a base station comprising transmitting, to a user equipment (UE), a request for the UE to transition to a connected mode, generating a transmission that provides multicast/broadcast services control channel (MCCH) configuration information, transmitting, via UE dedicated signaling, the transmission to the UE for configuration of an MCCH for the UE with an MCCH configuration related to the MCCH configuration information, determining a multicast point-to-multipoint (PTM) configuration for an inactive state of the UE, and transmitting, via the MCCH, the multicast PTM configuration to the UE for configuring the UE with the multicast PTM configuration.

Example 27 may include the method of example 26, wherein the MCCH configuration information comprises an indication of an MCCH configuration for the MCCH.

Example 28 may include the method of example 26, wherein the transmission comprises a first transmission, wherein the MCCH configuration information comprises first MCCH configuration information, wherein the first MCCH configuration information comprises a first portion of the MCCH configuration, and wherein the method further comprises generating a second transmission that provides second MCCH configuration information, wherein the second MCCH configuration information comprises a second portion of the MCCH configuration, and transmitting the second transmission to the UE for configuration of the MCCH.

Example 29 may include the method of example 26, wherein the transmission comprises a first transmission, wherein the MCCH configuration information comprises first MCCH configuration information, wherein the first MCCH configuration information comprises one or more MCCH configurations, and wherein the method further comprises generating a second transmission that provides an MCCH configuration index, the MCCH configuration index indicates the MCCH configuration from the one or more MCCH configurations, and transmitting, via scheduling downlink control information (DCI), the second transmission to the UE.

Example 30 may include the method of example 29, wherein the MCCH configuration index is for MCCH reception.

Example 31 may include a method of operating a user equipment (UE) comprising receiving, via radio resource control (RRC) dedicated signaling, security information for a multicast point-to-multipoint (PTM) configuration for an inactive state of the UE, receiving, via a multicast/broadcast services control channel (MCCH), an indication of the multicast PTM configuration with security protection, utilizing the security information to determine the multicast PTM configuration through the security protection, and implementing the multicast PTM configuration for the inactive state.

Example 32 may include the method of example 31, wherein the security information comprises a value related to a hash, wherein the indication of the multicast PTM configuration with security protection comprises a hashed indication of the multicast PTM configuration produced via the hash, and wherein utilizing the security information to determine the multicast PTM configuration comprises utilizing the value to determine the multicast PTM configuration from the hashed indication of the multicast PTM configuration.

Example 33 may include the method of example 31, wherein the security information comprises information related to a signature, wherein the indication of the multicast PTM configuration with security protection comprises a signed indication of the multicast PTM configuration signed via the signature, and wherein utilizing the security information to determine the multicast PTM configuration comprises utilizing the information related to the signature to determine the multicast PTM configuration from the signed indication of the multicast PTM configuration.

Example 34 may include the method of example 31, wherein the security information comprises a security key, wherein the indication of the multicast PTM configuration with security protection comprises a ciphered or integrity protected indication of the multicast PTM configuration, and wherein utilizing the security information to determine the multicast PTM configuration comprises utilizing the security key to determine the multicast PTM configuration from the ciphered or integrity protected indication of the multicast PTM configuration.

Example 35 may include the method of example 34, wherein the security key is specific to a multicast and broadcast service (MBS) session.

Example 36 may include the method of example 34, wherein the security key is for multiple MBS sessions.

Example 37 may include a method of operating a base station comprising transmitting, to a user equipment (UE), a request for the UE to transition to a connected mode, transmitting, via radio resource control (RRC) dedicated signaling to the UE while the UE is in the connected mode, security information for a multicast point-to-multipoint (PTM) configuration for an inactive state of the UE, generating an indication of the multicast PTM configuration with security protection related to the security information applied to the indication, and transmitting the indication of the multicast PTM configuration to the UE, the UE to utilize the security information to determine the multicast PTM configuration through the security protection.

Example 38 may include the method of example 37, wherein the security information comprises a value related to a hash, and wherein the indication of the multicast PTM configuration with security protection comprises a hashed indication of the multicast PTM configuration produced via the hash.

Example 39 may include the method of example 37, wherein the security information comprises information related to a signature, and wherein the indication of the multicast PTM configuration with security protection comprises a signed indication of the multicast PTM configuration signed via the signature.

Example 40 may include the method of example 37, wherein the security information comprises a security key, and wherein the indication of the multicast PTM configuration with security protection comprises a ciphered or integrity protected indication of the multicast PTM configuration.

Example 41 may include the method of example 40, wherein the security key is specific to a multicast and broadcast service (MBS) session.

Example 42 may include the method of example 40, wherein the security key is for multiple MBS sessions.

Example 43 may include an apparatus comprising means to perform one or more elements of a method described in or related to any of examples 1-42, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-42, or any other method or process described herein.

Example 45 may include an apparatus comprising logic, modules, or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-42, or portions thereof.

Example 48 may include a signal as described in or related to any of examples 1-42, or portions or parts thereof.

Example 49 may include a datagram, information element, packet, frame, segment, PDU, or message as described in or related to any of examples 1-42, or portions or parts thereof, or otherwise described in the present disclosure.

Example 50 may include a signal encoded with data as described in or related to any of examples 1-42, or portions or parts thereof, or otherwise described in the present disclosure.

Example 51 may include a signal encoded with a datagram, IE, packet, frame, segment, PDU, or message as described in or related to any of examples 1-42, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-42, or portions thereof.

Example 53 may include a computer program comprising instructions, wherein execution of the program by a processing element is to cause the processing element to carry out the method, techniques, or process as described in or related to any of examples 1-42, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

receive a first transmission that includes multicast or broadcast services control channel (MCCH) configuration information, the MCCH configuration information including one or more MCCH configurations;

receive, via scheduling downlink control information (DCI), a second transmission that provides an MCCH configuration index;

determine an MCCH configuration for an MCCH for a device from the one or more MCCH configurations based at least in part on the MCCH configuration index;

implement the MCCH configuration for the MCCH;

receive, via the MCCH configured with the MCCH configuration, a multicast point-to-multipoint (PTM) configuration for an inactive state of the device; and receive multicast transmissions in the inactive state based at least in part on the multicast PTM configuration.

2. The one or more non-transitory, computer-readable media of claim 1, wherein:

the MCCH configuration information includes an indication of the MCCH configuration; and to determine the MCCH configuration includes to receive the indication of the MCCH configuration in the MCCH configuration information.

3. The one or more non-transitory, computer-readable media of claim 1, wherein the MCCH configuration index is for physical downlink shared channel (PDSCH) reception.

4. The one or more non-transitory, computer-readable media of claim 1, wherein the first transmission is received via UE dedicated signaling.

5. The one or more non-transitory, computer-readable media of claim 1, wherein the instructions, when executed, further cause the processing circuitry to:

receive, via the MCCH, reconfiguration information related to a medium access control (MAC) related scheduling or discontinuous reception (DRX) configuration; and reconfigure the multicast PTM configuration based at least in part on the reconfiguration information.

6. The one or more non-transitory, computer-readable media of claim 5, wherein the reconfiguration information includes DRX offset information.

7. A method comprising:

generating, for transmission to a device, a request for the device to transition to a connected mode;

generating, for transmission via user equipment (UE) dedicated signaling to the device, a first transmission that provides multicast or broadcast services control channel (MCCH) configuration information, the transmission for configuration of an MCCH for the device with an MCCH configuration related to the MCCH configuration information, and the MCCH configuration information comprising one or more MCCH configurations;

generating, for transmission via downlink control information (DCI) to the device, a second transmission that provides an MCCH configuration index, the MCCH configuration index indicating the MCCH configuration from the one or more MCCH configurations;

determining a multicast point-to-multipoint (PTM) configuration for an inactive state of the device; and generating, for transmission to the device via the MCCH, the multicast PTM configuration to the device for configuring the device with the multicast PTM configuration.

8. The method of claim 7, wherein the MCCH configuration information comprises an indication of the MCCH configuration for the MCCH.

9. The method of claim 7, wherein the MCCH configuration index is for MCCH reception.

10. The method of claim 7 further comprising:

generating, for transmission via the MCCH, reconfiguration information related to a medium access control (MAC) related scheduling or discontinuous reception (DRX) configuration, the reconfiguration information to cause the device to reconfigure the multicast PTM configuration.

11. The method of claim 10, wherein the reconfiguration information comprises DRX offset information.

12. An apparatus comprising:

processing circuitry to:

receive, via user equipment (UE) dedicated signaling, a first transmission that includes multicast or broadcast services control channel (MCCH) configuration information, the MCCH configuration information including one or more MCCH configurations;

receive, via scheduling downlink control information (DCI), a second transmission that provides an MCCH configuration index;

determine an MCCH configuration for an MCCH for a device from the one or more MCCH configurations and based at least in part on the MCCH configuration index;

implement the MCCH configuration for the MCCH;

receive, via the MCCH configured with the MCCH configuration, a multicast point-to-multipoint (PTM) configuration for an inactive state of the device; and receive multicast transmissions in the inactive state based at least in part on the multicast PTM configuration; and interface circuitry coupled with the processing circuitry, the interface circuitry to receive the first transmission.

13. The apparatus of claim 12, wherein:

the MCCH configuration information includes an indication of the MCCH configuration; and to determine the MCCH configuration includes to receive the indication of the MCCH configuration in the MCCH configuration information.

14. The apparatus of claim 12, wherein the MCCH configuration index is for physical downlink shared channel (PDSCH) reception.

* * * * *